US010523965B2

(12) United States Patent
Wang et al.

(10) Patent No.: US 10,523,965 B2
(45) Date of Patent: Dec. 31, 2019

(54) VIDEO CODING METHOD, VIDEO DECODING METHOD, VIDEO CODING APPARATUS, AND VIDEO DECODING APPARATUS

(71) Applicant: Huawei Technologies Co., Ltd., Shenzhen, Guangdong (CN)

(72) Inventors: Zhao Wang, Beijing (CN); Siwei Ma, Beijing (CN); Zhuoyi Lv, Shenzhen (CN); Haitao Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 169 days.

(21) Appl. No.: 15/860,531

(22) Filed: Jan. 2, 2018

(65) Prior Publication Data

US 2018/0131960 A1 May 10, 2018

Related U.S. Application Data

(63) Continuation of application No. PCT/CN2016/088157, filed on Jul. 1, 2016.

(30) Foreign Application Priority Data

Jul. 3, 2015 (CN) .......................... 2015 1 0391858

(51) Int. Cl.
*H04N 19/56* (2014.01)
*H04N 19/523* (2014.01)
*H04N 19/182* (2014.01)

(52) U.S. Cl.
CPC .......... *H04N 19/56* (2014.11); *H04N 19/523* (2014.11); *H04N 19/182* (2014.11)

(58) Field of Classification Search
CPC .... H04N 19/56; H04N 19/523; H04N 19/182; H04N 19/14; H04N 19/57; H04N 19/109;
(Continued)

(56) References Cited

U.S. PATENT DOCUMENTS 6,442,203 B1 * 8/2002 Demos ................... H04N 5/145
348/699
6,765,965 B1 * 7/2004 Hanami ................ H04N 5/145
348/E5.066
(Continued)

FOREIGN PATENT DOCUMENTS

CN 1700736 A 11/2005
CN 101009841 A 8/2007
(Continued)

OTHER PUBLICATIONS

Ma Siwei, "History and Recent Developments of AVS Video Coding Standards," Journal of Computer Research and Development 52(i): 27-37, 2015, Dec. 18, 2014, 11 pages.
(Continued)

*Primary Examiner* — James M Pontius
(74) *Attorney, Agent, or Firm* — Conley Rose, P.C.

(57) ABSTRACT

Embodiments of the present disclosure disclose a video coding method which includes: obtaining a current picture, motion vector precision of the current picture according to the current picture, where the motion vector precision includes a search step size set, and each search step size in the search step size set is less than a pixel unit; obtaining a current block and a reference picture of the current block; determining a search start point in the reference picture, and searching, from the search start point, for a target integer pixel by using a pixel unit as a search step size; searching, from the target integer pixel, for a match block of the current block according to the motion vector precision; obtaining motion vector information and a prediction residual signal; and the reference picture, the motion vector information, and the prediction residual signal into a bitstream.

21 Claims, 9 Drawing Sheets

(58) Field of Classification Search
CPC ... H04N 19/139; H04N 19/136; H04N 19/533
See application file for complete search history.

(56) References Cited

U.S. PATENT DOCUMENTS

| | | | |
|---|---|---|---|
| 6,968,008 | B1 | 11/2005 | Ribas-Corbera et al. |
| 2003/0072373 | A1* | 4/2003 | Sun ............... H04N 5/145 375/240.6 |
| 2005/0265454 | A1 | 12/2005 | Muthukrishnan et al. |
| 2006/0002474 | A1* | 1/2006 | Au ................ H04N 19/56 375/240.16 |
| 2006/0233258 | A1 | 10/2006 | Holcomb |
| 2007/0183504 | A1 | 8/2007 | Hoffman et al. |
| 2010/0135394 | A1 | 6/2010 | Valente et al. |
| 2011/0103545 | A1* | 5/2011 | Liu ................ A61B 6/032 378/19 |
| 2012/0093226 | A1 | 4/2012 | Chien et al. |
| 2012/0201293 | A1 | 8/2012 | Guo et al. |
| 2012/0207220 | A1 | 8/2012 | Kim et al. |
| 2013/0202047 | A1 | 8/2013 | Song et al. |
| 2016/0337661 | A1* | 11/2016 | Pang ............... H04N 19/105 |
| 2016/0337662 | A1* | 11/2016 | Pang ............... H04N 19/176 |
| 2019/0020895 | A1* | 1/2019 | Liu ................. H04N 19/573 |

FOREIGN PATENT DOCUMENTS

| | | |
|---|---|---|
| CN | 101267556 A | 9/2008 |
| CN | 101326550 A | 12/2008 |
| CN | 101699865 A | 4/2010 |
| CN | 101815218 A | 8/2010 |
| CN | 101902632 A | 12/2010 |
| CN | 102075760 A | 5/2011 |
| CN | 102687511 A | 9/2012 |
| CN | 102790884 A | 11/2012 |
| CN | 103155560 A | 6/2013 |
| CN | 103414899 A | 11/2013 |
| CN | 103957420 A | 7/2014 |
| CN | 104469380 A | 3/2015 |
| CN | 140702957 A | 6/2015 |
| JP | H07123411 A | 5/1995 |
| WO | 2006124885 A2 | 11/2006 |
| WO | 2007078800 A1 | 7/2007 |

OTHER PUBLICATIONS

ITU-T H.264 (Feb. 2014), Series H: Audiovisual and Multimedia Systems, Infrastructure of audiovisual services—Coding of moving video, Advanced video coding for generic audiovisual services, Feb. 2014, 790 pages.
ITU-T H.263 (Jan. 2005), Series H: Audiovisual and Multimedia Systems, Infrastructure of audiovisual services—Coding of moving video, Video coding for low bit rate communication, Jan. 2005, 226 pages.
ITU-T H.263 Implementors' Guide (Aug. 5, 2005), Series H: Audiovisual and Multimedia Systems, Codins of moving video, Implementors Guide for H.263: "Video coding for low bit rate communication," Aug. 5, 2005, 10 pages.
"Joint Call for Proposals on Video Compression Technology"; ITU-Telecommunications Standardization Sector; Video Coding Experts Group; Study Group 16 Question 6; Document VCEG-AM91; Kyoto, Japan; Jan. 17-22, 2010; 19 pages.
Ma et al.; "Progressive Motion Vector Resolution for HEVC"; 2013 Visual Communications and Image Processing (VCIP); Kuching, Malaysia; Nov. 17-20, 2013; 6 pages.
Machine Translation and Abstract of Chinese Publication No. CN101009841, Aug. 1, 2007, 14 pages.
Machine Translation and Abstract of Chinese Publication No. CN102790884, Nov. 21, 2012, 21 pages.
Machine Translation and Abstract of Japanese Publication No. JPH07123411, May 12, 1995, 13 pages.
Foreign Communication From a Counterpart Application, Chinese Application No. 201680037414.9, Chinese Office Action dated Jun. 19, 2019, 10 pages.
Foreign Communication From a Counterpart Application, Chinese Application No. 201680037414.9, Chinese Search Report dated Jun. 10, 2019, 3 pages.
Communication pursuant to Article 94(3) EPC, dated Apr. 23, 2019, in European Application No. 16820797.5 (7 pp.).
Karczewicz et al.; "Video coding technology proposal by Qualcomm Inc."; JCT-VC of ITU-T SG16 and ISO/IEC JTC1/SC29/WG11; JCTVC-A121; Dresden, Germany; Apr. 15-23, 2010; 25 pages.
Jung et al.; "Non-CE3: Adaptive Motion Vector Resolution based on the PU Size"; JCT-VC of ITU-T SG16 WP3 and ISO/IEC JTC1/SC29/WG11; JCTVC-G600; Geneva, Switzerland; Nov. 21-30, 2011; 4 pages.
Li et al.; "Adaptive motion vector resolution for screen content"; JCT-VC of ITU-T SG 16 WP 3 and ISO/IEC JTC 1/SC 29/WG 11; JCTVC-S0085 r1; Strasbourg, France; Oct. 17-24, 2014; 14 pages.

* cited by examiner

VIDEO CODING METHOD, VIDEO DECODING METHOD, VIDEO CODING APPARATUS, AND VIDEO DECODING APPARATUS

CROSS-REFERENCE TO RELATED APPLICATIONS

This application is a continuation of International Application No. PCT/CN2016/088157, filed on Jul. 1, 2016, which claims priority to Chinese Patent Application No. 201510391858.X, filed with the Chinese Patent Office on Jul. 3, 2015. These disclosures of the aforementioned applications are hereby incorporated by reference in their entireties.

TECHNICAL FIELD

The present disclosure relates to the field of picture processing technologies, and in particular, to a video coding method, a video decoding method, a video coding apparatus, and a video decoding apparatus.

BACKGROUND

As Internet technologies develop quickly and material and spiritual cultures of people become richer, there are more requirements for video applications on the Internet, and in particular, requirements for high-definition video applications. However, a data volume of a high-definition video is huge, and a problem of compression coding of the high-definition video must be first resolved, so that the high-definition video can be transmitted on the bandwidth-limited Internet. Currently, there are two international organizations dedicated to developing international video coding standards, namely, the Motion Picture Experts Group (MPEG) in the International Organization for Standardization (ISO)/International Electrotechnical Commission (IEC), and the Video Coding Experts Group (VCEG) in the International Telecommunication Union—Telecommunication Standardization Sector (ITU-T). Established in 1986, the MPEG is dedicated to developing related standards in the multimedia field, and the standards are mainly applied to storage, broadcast and television, streaming media on the Internet or a wireless network, and the like. The ITU-T mainly develops video coding standards in the real-time video communications field, such as videophone and videoconferencing applications.

In the past decades, international video coding standards oriented to various applications were successfully developed, mainly including the MPEG-1 standard applied to a video compact disc (VCD), the MPEG-2 standard applied to a Digital Video Disc (DVD) and digital video broadcasting (DVB), the H.261 standard, H.263 standard, and H.264 standard applied to videoconferencing, the MPEG-4 standard allowing coding of an object in any form, and the latest high efficiency video coding (HEVC) standard.

Because a strong time correlation exists between adjacent pictures in a picture sequence, each picture in the picture sequence may be divided into several non-overlapping coding blocks, and it is considered that motions of all pixels in a coding block are the same. Motion vectors are allocated in units of coding blocks. When inter-picture prediction is performed on a current coding block in a current coding picture, a reconstructed coding picture is used as a reference picture. With respect to the current coding block, a motion search is performed in a search region in the reference picture to find a block that satisfies a match rule with the current coding block, and this block is a match block. A relative offset between a spatial position of the current coding block and that of the match block in the reference picture is a motion vector (MV). A process of obtaining the motion vector is referred to as motion estimation (ME). When compression coding is performed on a video, reference picture information, motion vector information, and a difference (residual value) between a reconstructed pixel value of the match block and an original pixel value of the current block are encoded and then sent to a decoder. The decoder finds, in the decoded reference picture, a block in a position to which the motion vector points, and adds the residual value to restore the current block. Motion estimation may be used to remove inter-picture redundancy in the video sequence, so that a quantity of bits in video transmission is greatly reduced.

Due to object motion continuity, not all motion vectors of blocks between adjacent pictures use integer pixels as basic units. Real motion displacement may be in units of subpixels such as a ¼ pixel or even a ⅛ pixel. Both H.264 and HEVC use fixed ¼ pixel motion vector precision for luminance and ⅛ pixel motion vector precision for chrominance. In comparison with integer pixel motion vector precision, this greatly improves coding performance. When sub-pixel motion vector precision is used, correspondingly, in a given search range in the reference picture, a search step size in the process of searching for the match block of the current block is of also sub-pixel motion vector precision. In addition, during coding of all video pictures in a video sequence, a search step size used in a reference picture for a current block of each video picture uses fixed sub-pixel motion vector precision.

However, the inventors of this application find that for a video sequence with different content features, use of fixed motion vector precision is unfavorable to coding of the video sequence.

SUMMARY

Embodiments of the present disclosure provide a video coding method, a video decoding method, a video coding apparatus, and a video decoding apparatus, so that coding and decoding can be performed with reference to video features.

According to a first aspect, an embodiment of the present disclosure provides a video coding method, including:

obtaining a current picture, and obtaining motion vector precision of the current picture according to the current picture, where the motion vector precision includes a search step size set, and each search step size in the search step size set is less than a pixel unit;

obtaining a current block and a reference picture of the current block, where the current block is a current to-be-coded picture block in the current picture;

determining a search start point in the reference picture, and searching, from the search start point, for a target integer pixel by using a pixel unit as a search step size;

searching, from the target integer pixel, for a match block of the current block according to the motion vector precision;

obtaining motion vector information and a prediction residual signal, where the motion vector information includes a quantity of search steps for the match block relative to the search start point, and a search direction, and the prediction residual signal is used to indicate a residual between the current block and the match block; and writing information about the reference picture, the motion vector information, and the prediction residual signal into a bitstream, where the information about the reference picture is used to indicate the reference picture.

With reference to the first aspect, in a first possible implementation, the method further includes:

writing information about the motion vector precision and/or information about the search start point into the bitstream, where the information about the motion vector precision is used to indicate the motion vector precision, and the information about the search start point is used to indicate the search start point.

With reference to the first aspect, in a second possible implementation, the search step size set is $\{½^x\}$, where x is a positive integer.

With reference to the second possible implementation of the first aspect, in a third possible implementation of the first aspect, the searching, from the target integer pixel, for a match block according to the motion vector precision includes:

using the target integer pixel as a start point;

setting an initial value of j to 1, and performing a preset step:

obtaining a target $½^j$ pixel from all $½^j$ pixels that are adjacent to the start point; and determining whether j is equal to x, and if j is equal to x, determining a position of the target $½^j$ pixel as a position of the match block; or if j is not equal to x, using the target $½^j$ pixel as a start point, and after adding 1 to the value of j, repeating the preset step.

With reference to the first aspect, in a fourth possible implementation, the search step size set is $\{y|y=½^x$, where x is a positive integer$\}$;

the motion vector precision further includes a threshold set, and the threshold set includes at least one threshold; and the method further includes:

determining, according to each threshold in the threshold set and the search start point, a search region corresponding to the threshold, where the search start point is located in the search region, and a search step size in the search region corresponding to each threshold corresponds to each element in the search step size set on a one-to-one basis; where with respect to adjacent step sizes y1 and y2 sorted in the search step size set, y1<y2, and a search region corresponding to a threshold corresponding to y2 surrounds a search region corresponding to a threshold corresponding to y1 and is connected to the search region corresponding to the threshold corresponding to y1.

With reference to the fourth possible implementation of the first aspect, in a fifth possible implementation of the first aspect, the threshold set includes m1 and m2, where m1 is a positive integer multiple of 2 or is 0, m2 is a positive integer multiple of 4, and m1<m2; and the determining, according to each threshold in the threshold set and the search start point, a search region corresponding to the threshold includes:

when the search start point is located on an integer pixel or a ½ pixel, performing the following steps:

using a region in a first square as a search region corresponding to m1, where the first square is a square that uses the search start point as a center and uses 2m1*minimum pixel unit as a side length; and using a region between the first square and a second square as a search region corresponding to m2, where the second square is a square that uses the search start point as a center and uses 2m2*minimum pixel unit as a side length; or when the search start point is neither located on an integer pixel nor located on a ½ pixel, performing the following steps:

using a region in a third square as a search region corresponding to m1, where the third square is a square that uses a y2 pixel closest to the search start point as a center and uses 2m1*minimum pixel unit as a side length; and using a region between the third square and a fourth square as a search region corresponding to m2, where the fourth square is a square that uses a y3 pixel closest to the search start point as a center and uses 2m2*minimum pixel unit as a side length, and when a maximum element in the search step size set is $½^i$, $y3=½^{i-1}$; where the minimum pixel unit is a minimum element in the search step size set.

With reference to the fourth possible implementation or the fifth possible implementation of the first aspect, in a sixth possible implementation of the first aspect, elements in the search step size set include y1 and y2, where y1<y2; elements in the threshold set include m1 and m2, where m1<m2; and the searching, from the target integer pixel, for a match block according to the motion vector precision includes:

obtaining a current start point according to the target integer pixel;

obtaining all y2 pixels adjacent to the current start point; and when all the y2 pixels are located outside the search region corresponding to m2, determining a position of the current start point as a position of the match block; or when at least a part of all the y2 pixels are located in the search region corresponding to m2, performing the following steps:

obtaining a target y2 pixel from the y2 pixels located in the search region corresponding to m2;

obtaining all y1 pixels adjacent to the target y2 pixel; and when all the y1 pixels are located outside the search region corresponding to m1, determining a position of the target y2 pixel as a position of the match block; or when at least a part of all the y1 pixels are located in the search region corresponding to m1, obtaining a target y1 pixel from the y1 pixels located in the search region corresponding to m1, and determining a position of the target y1 pixel as a position of the match block.

With reference to the fourth possible implementation of the first aspect, in a seventh possible implementation of the first aspect, the search step size set is $\{¼, ⅛\}$, or is $\{½, ¼, ⅛\}$, or is $\{¼, ⅛, 1/16\}$, or is $\{½, ¼, ⅛, 1/16\}$.

With reference to the first aspect, in an eighth possible implementation, the obtaining motion vector precision of the current picture according to the current picture includes:

obtaining a quantization parameter of the current picture and a coded picture set, where the coded picture set includes at least one coded picture;

obtaining coding information of each coded picture in the coded picture set, where the coding information includes a motion vector difference of each coding block in the coded picture and a quantity of pixels included in each coding block in the coded picture, and the motion vector difference of the coding block is used to indicate the motion vector information when the coding block is the current block;

computing motion intensity of each coded picture in the coded picture set, where the motion intensity of the coding picture is an average value of first values of all coding blocks in the coding picture, and a first value of each coding block is a product of a sum of an absolute value of a horizontal component of the motion vector difference of the coding block and an absolute value of a vertical component of the motion vector difference of the coding block and the quantity of pixels included in the coding block;

using a weighted average value of motion intensity of all coding pictures in the coded picture set as motion intensity of the coded picture set; and determining the motion vector precision of the current picture according to the motion intensity of the coded picture set and the quantization parameter of the current picture and according to a preset policy.

With reference to the eighth possible implementation of the first aspect, in a ninth possible implementation of the first aspect, the obtaining motion vector precision of the current picture according to the current picture further includes:

obtaining a reference parameter, where the reference parameter includes one of texture complexity of the current picture, texture complexity of the coded picture set, or inter-picture noise of the coded picture set, or includes inter-picture noise of the coded picture set and one of texture complexity of the current picture or texture complexity of the coded picture set;

where when the reference parameter includes the texture complexity of the current picture, the obtaining a reference parameter includes:

obtaining a pixel value of each pixel in the current picture; and computing an average value of quadratic sums of differences between pixel values of pixels and pixel values of adjacent pixels thereof in the current picture, and using the average value as the texture complexity of the current picture; or when the reference parameter includes the texture complexity of the coded picture set, the obtaining a reference parameter includes:

obtaining a pixel value of each pixel in each coded picture in the coded picture set;

computing an average value of quadratic sums of differences between pixel values of pixels and pixel values of adjacent pixels thereof in the coded picture, and using the average value as texture complexity of the coded picture; and using a weighted average value of texture complexity of all coding pictures in the coded picture set as the texture complexity of the coded picture set; or when the reference parameter includes the inter-picture noise of the coded picture set, the obtaining a reference parameter includes:

obtaining a prediction error of each pixel in each coded picture in the coded picture set;

computing a second average value of each coding picture, where the second average value is an average value of absolute values of prediction residual of all pixels in the coding picture; and using a weighted average value of second average values of all coded pictures in the coded picture set as the inter-picture noise of the coded picture set; and the determining the motion vector precision of the current picture according to the motion intensity of the coded picture set and the quantization parameter of the current picture and according to a preset policy specifically includes:

determining the motion vector precision of the current picture according to the motion intensity of the coded picture set, the quantization parameter of the current picture, and the reference parameter, and according to the preset policy.

With reference to the first aspect, in a tenth possible implementation of the first aspect, the obtaining motion vector precision of the current picture according to the current picture includes:

obtaining a quantization parameter of the current picture;

obtaining a width value in a resolution of the current picture; and determining the motion vector precision of the current picture according to the width value and the quantization parameter of the current picture and according to a preset policy.

According to a second aspect, an embodiment of the present disclosure provides a video decoding method, including:

obtaining a current picture and motion vector precision of the current picture, where the motion vector precision includes a search step size set, and each search step size in the search step size set is less than a pixel unit;

obtaining motion vector information of a current block, a prediction residual signal, a reference picture of the current block, and a search start point in the reference picture, where the current block is a current to-be-decoded picture block in the current picture, the motion vector information includes a quantity of search steps for a match block of the current block, relative to the search start point, and a search direction in the reference picture, and the prediction residual signal is used to indicate a residual between the current block and the match block;

searching for the match block of the current block according to the reference picture, the search start point, the motion vector information, and the motion vector precision of the current picture; and obtaining a reconstructed pixel value of the current block according to the match block and the prediction residual signal.

With reference to the second aspect, in a first possible implementation, the search step size set is $\{\frac{1}{2}^x\}$, where x is a positive integer.

With reference to the second aspect, in a second possible implementation, the search step size set is $\{y|y=\frac{1}{2}^x$, where $x \in N+\}$;

the motion vector precision further includes a threshold set, and the threshold set includes at least one threshold; and the method further includes:

determining, according to each threshold in the threshold set and the search start point, a search region corresponding to the threshold, where the search start point is located in the search region, and search step sizes in search regions corresponding to different thresholds are different elements in the search step size set; where elements in the threshold set correspond to different elements in the search step size set; and with respect to adjacent y1 and y2 sorted in the search step size set, y1<y2, and a search region corresponding to a threshold corresponding to y2 surrounds a search region corresponding to a threshold corresponding to y1 and is connected to the search region corresponding to the threshold corresponding to y1.

With reference to the second possible implementation of the second aspect, in a third possible implementation, the threshold set includes m1 and m2, where m1 is a positive integer multiple of 2 or is 0, m2 is a positive integer multiple of 4, and m1<m2; and the determining, according to each threshold in the threshold set and the search start point, a search region corresponding to the threshold includes:

when the search start point is located on an integer pixel or a ½ pixel, performing the following steps:

using a region in a first square as a search region corresponding to m1, where the first square is a square that uses the search start point as a center and uses 2m1*minimum pixel unit as a side length; and using a region between the first square and a second square as a search region corresponding to m2, where the second square is a square that uses the search start point as a center and uses 2m2*minimum pixel unit as a side length; or when the search start point is neither located on an integer pixel nor located on a ½ pixel, performing the following steps:

using a region in a third square as a search region corresponding to m1, where the third square is a square that uses a y2 pixel closest to the search start point as a center and uses 2m1*minimum pixel unit as a side length; and using a region between the third square and a fourth square as a search region corresponding to m2, where the fourth square is a square that uses a y3 pixel closest to the search start point as a center and uses 2m2*minimum pixel unit as a side length, and when a maximum element in the search step size set is $½^i$, $y3=½^{i-1}$; where the minimum pixel unit is a minimum element in the search step size set.

With reference to the third possible implementation of the second aspect, in a fourth possible implementation, the elements in the search step size set include y1 and y2, where y1<y2; the elements in the threshold set include m1 and m2; and the searching for the match block according to the reference picture, the search start point, the motion vector information, and the motion vector precision of the current picture includes:

determining a reference search region, where a center Ce of the reference search region is located between a center Ce1 of the search region corresponding to m1 and a center Ce2 of the search region corresponding to m2, $Ce=f_1(Ce1, Ce2)$, a side length L of the reference search region is greater than a side length L1 of the search region corresponding to m1 and less than a side length L2 of the search region corresponding to m2, $L=f_2(L1,L2)$, and $f_1(x1,x2)=f_2(x1,x2)$;

determining a temporary point, where a motion vector of the temporary point relative to the search start point is the quantity of search steps and the search direction in the motion vector information, and a search step size is the minimum element in the search step size set; and when the temporary point is located outside the reference search region, determining a first quantity of steps, a second quantity of steps, and a third quantity of steps, where the quantity of search steps is a sum of the first quantity of steps, the second quantity of steps, and the third quantity of steps, a search step size actually corresponding to the first quantity of steps is y1, a search step size actually corresponding to the second quantity of steps is y2, a search step size actually corresponding to the third quantity of steps is y3, and when the maximum element in the search step size set is $½^i$, $y3=½^{i-1}$; or when the temporary point is located in the reference search region, performing the following step:

when the temporary point is located outside the search region corresponding to m1, determining a third quantity of steps and a fourth quantity of steps, where the quantity of search steps is a sum of the third quantity of steps and the fourth quantity of steps, a search step size actually corresponding to the third quantity of steps is y1, and a search step size actually corresponding to the fourth quantity of steps is y2; or when the temporary point is located in the search region corresponding to m1, determining that a search step size actually corresponding to the quantity of search steps is y1.

With reference to the second possible implementation of the second aspect, in a fifth possible implementation, the search step size set is {¼, ⅛}, or is {½, ¼, ⅛}, or is {¼, ⅛, ¹⁄₁₆}, or is {½, ¼, ⅛, ¹⁄₁₆}.

With reference to the second aspect, in a sixth possible implementation, the obtaining a current picture and motion vector precision of the current picture includes:

receiving a bitstream of a video; and reading the current picture and the motion vector precision of the current picture from the bitstream of the video.

With reference to the second aspect, in a seventh possible implementation, the obtaining a current picture and motion vector precision of the current picture includes:

receiving a bitstream of a compressed video;

reading the current picture from the bitstream of the compressed video;

obtaining a quantization parameter of the current picture;

determining a decoded picture set, where the decoded picture set includes at least one current decoded picture;

obtaining decoding information of each decoded picture in the decoded picture set, where the decoding information includes a motion vector difference of each decoding block in the decoded picture and a quantity of pixels included in each decoding block in the decoded picture, and the motion vector difference of the decoding block is used to indicate the motion vector information when the decoding block is the current block;

computing motion intensity of each decoding picture in the decoded picture set, where the motion intensity of the decoding picture is an average value of first values of all decoding blocks in the decoding picture, and the first value of the decoding block is a product of a sum of an absolute value of a horizontal component of the motion vector difference of the decoding block and an absolute value of a vertical component of the motion vector difference of the decoding block and the quantity of pixels included in the decoding block;

using a weighted average value of motion intensity of all decoding pictures in the decoded picture set as motion intensity of the decoded picture set; and obtaining the motion vector precision of the current picture according to the motion intensity of the decoded picture set and the quantization parameter of the current picture and according to a preset policy.

With reference to the seventh possible implementation of the second aspect, in an eighth possible implementation, the obtaining a current picture and motion vector precision of the current picture further includes:

obtaining pixel values of all pixels in each decoded picture in the decoded picture set;

computing an average value of quadratic sums of differences between pixel values of pixels and pixel values of adjacent pixels thereof in the decoded picture, and using the average value as texture complexity of the decoded picture; and using a weighted average value of texture complexity of all decoded pictures in the decoded picture set as texture complexity of the decoded picture set; and the obtaining the motion vector precision of the current picture according to the motion intensity of the decoded picture set and the quantization parameter of the current picture and according to a preset policy specifically includes:

determining the motion vector precision of the current picture according to the motion intensity of the decoded picture set, the quantization parameter of the current picture, and the texture complexity of the decoded picture set, and according to the preset policy.

With reference to the second aspect, in a ninth possible implementation, the obtaining motion vector precision of the current picture includes:

obtaining a quantization parameter of the current picture;

obtaining a width value in a resolution of the current picture; and determining the motion vector precision of the current picture according to the width value and the quantization parameter of the current picture and according to a preset policy.

According to a third aspect, an embodiment of the present disclosure provides a video coding apparatus, including:

a first obtaining unit, configured to obtain a current picture, and obtain motion vector precision of the current picture according to the current picture, where the motion vector precision includes a search step size set, and each search step size in the search step size set is less than a pixel unit;

a second obtaining unit, configured to obtain a current block and a reference picture of the current block, where the current block is a current to-be-coded picture block in the current picture;

a first determining unit, configured to determine a search start point in the reference picture, and search, from the search start point, for a target integer pixel by using a pixel unit as a search step size;

a search unit, configured to search, from the target integer pixel, for a match block of the current block according to the motion vector precision;

a third obtaining unit, configured to obtain motion vector information and a prediction residual signal, where the motion vector information includes a quantity of search steps for the match block relative to the search start point, and a search direction, and the prediction residual signal is used to indicate a residual between the current block and the match block; and a writing unit, configured to write information about the reference picture, the motion vector information, and the prediction residual signal into a bitstream, where the information about the reference picture is used to indicate the reference picture.

With reference to the third aspect, in a first possible implementation, the writing unit is further configured to write information about the motion vector precision and/or information about the search start point into the bitstream, where the information about the motion vector precision is used to indicate the motion vector precision, and the information about the search start point is used to indicate the search start point.

With reference to the third aspect, in a second possible implementation, the search step size set is $\{1/2^x\}$, where x is a positive integer.

With reference to the second possible implementation of the third aspect, in a third possible implementation of the third aspect, the search unit is specifically configured to:

use the target integer pixel as a start point;

set an initial value of j to 1, and perform a preset step:

obtaining a target $1/2^j$ pixel from all $1/2^j$ pixels that are adjacent to the start point; and determine whether j is equal to x, and if j is equal to x, determine a position of the target $1/2^j$ pixel as a position of the match block; or if j is not equal to x, use the target $1/2^j$ pixel as a start point, and after adding 1 to the value of j, repeat the preset step.

With reference to the third aspect, in a fourth possible implementation, the search step size set is $\{y|y=1/2^x$, where x is a positive integer$\}$; the motion vector precision further includes a threshold set, and the threshold set includes at least one threshold; and the video coding apparatus further includes:

a second determining unit, configured to determine, according to each threshold in the threshold set and the search start point, a search region corresponding to the threshold, where the search start point is located in the search region, and a search step size in the search region corresponding to each threshold corresponds to each element in the search step size set on a one-to-one basis; where with respect to adjacent step sizes y1 and y2 sorted in the search step size set, y1<y2, and a search region corresponding to a threshold corresponding to y2 surrounds a search region corresponding to a threshold corresponding to y1 and is connected to the search region corresponding to the threshold corresponding to y1.

With reference to the fourth possible implementation of the third aspect, in a fifth possible implementation of the third aspect, the threshold set includes m1 and m2, where m1 is a positive integer multiple of 2 or is 0, m2 is a positive integer multiple of 4, and m1<m2; and the second determining unit is specifically configured to:

when the search start point is located on an integer pixel or a ½ pixel, perform the following steps:

using a region in a first square as a search region corresponding to m1, where the first square is a square that uses the search start point as a center and uses 2m1*minimum pixel unit as a side length; and using a region between the first square and a second square as a search region corresponding to m2, where the second square is a square that uses the search start point as a center and uses 2m2*minimum pixel unit as a side length; or when the search start point is neither located on an integer pixel nor located on a ½ pixel, perform the following steps:

using a region in a third square as a search region corresponding to m1, where the third square is a square that uses a y2 pixel closest to the search start point as a center and uses 2m1*minimum pixel unit as a side length; and using a region between the third square and a fourth square as a search region corresponding to m2, where the fourth square is a square that uses a y3 pixel closest to the search start point as a center and uses 2m2*minimum pixel unit as a side length, and when a maximum element in the search step size set is $1/2^i$, $y3=1/2^{i-1}$; where the minimum pixel unit is a minimum element in the search step size set.

With reference to the fourth possible implementation or the fifth possible implementation of the third aspect, in a sixth possible implementation of the third aspect, elements in the search step size set include y1 and y2, where y1<y2; elements in the threshold set include m1 and m2, where m1<m2; and the search unit is specifically configured to:

obtain a current start point according to the target integer pixel;

obtain all y2 pixels adjacent to the current start point; and when all the y2 pixels are located outside the search region corresponding to m2, determine a position of the current start point as a position of the match block; or when at least a part of all the y2 pixels are located in the search region corresponding to m2, perform the following steps:

obtaining a target y2 pixel from the y2 pixels located in the search region corresponding to m2;

obtaining all y1 pixels adjacent to the target y2 pixel; and when all the y1 pixels are located outside the search region corresponding to m1, determining a position of the target y2 pixel as a position of the match block; or when at least a part of all the y1 pixels are located in the search region corresponding to m1, obtaining a target y1 pixel from the y1 pixels located in the search region corresponding to m1, and determining a position of the target y1 pixel as a position of the match block.

With reference to the fourth possible implementation of the third aspect, in a seventh possible implementation of the third aspect, the search step size set is {¼, ⅛}, or is {½, ¼, ⅛}, or is {¼, ⅛, 1/16}, or is {½, ¼, ⅛, 1/16}.

With reference to the third aspect, in an eighth possible implementation, the first obtaining unit is specifically configured to:

obtain a quantization parameter of the current picture and a coded picture set, where the coded picture set includes at least one coded picture;

obtain coding information of each coded picture in the coded picture set, where the coding information includes a motion vector difference of each coding block in the coded picture and a quantity of pixels included in each coding block in the coded picture, and the motion vector difference of the coding block is used to indicate the motion vector information when the coding block is the current block;

compute motion intensity of each coded picture in the coded picture set, where the motion intensity of the coding picture is an average value of first values of all coding blocks in the coding picture, and a first value of each coding block is a product of a sum of an absolute value of a horizontal component of the motion vector difference of the coding block and an absolute value of a vertical component of the motion vector difference of the coding block and the quantity of pixels included in the coding block;

use a weighted average value of motion intensity of all coding pictures in the coded picture set as motion intensity of the coded picture set; and determine the motion vector precision of the current picture according to the motion intensity of the coded picture set and the quantization parameter of the current picture and according to a preset policy.

With reference to the eighth possible implementation of the third aspect, in a ninth possible implementation of the third aspect, the first obtaining unit is further configured to:

obtain a reference parameter, where the reference parameter includes one of texture complexity of the current picture, texture complexity of the coded picture set, or inter-picture noise of the coded picture set, or includes inter-picture noise of the coded picture set and one of texture complexity of the current picture or texture complexity of the coded picture set;

where when the reference parameter includes the texture complexity of the current picture, the first obtaining unit is configured to:

obtain a pixel value of each pixel in the current picture; and compute an average value of quadratic sums of differences between pixel values of pixels and pixel values of adjacent pixels thereof in the current picture, and use the average value as the texture complexity of the current picture; or when the reference parameter includes the texture complexity of the coded picture set, the first obtaining unit is configured to:

obtain a pixel value of each pixel in each coded picture in the coded picture set;

compute an average value of quadratic sums of differences between pixel values of pixels and pixel values of adjacent pixels thereof in the coded picture, and use the average value as texture complexity of the coded picture; and use a weighted average value of texture complexity of all coding pictures in the coded picture set as the texture complexity of the coded picture set; or when the reference parameter includes the inter-picture noise of the coded picture set, the first obtaining unit is configured to:

obtain a prediction error of each pixel in each coded picture in the coded picture set;

compute a second average value of each coding picture, where the second average value is an average value of absolute values of prediction residual of all pixels in the coding picture; and use a weighted average value of second average values of all coded pictures in the coded picture set as the inter-picture noise of the coded picture set; and the determining the motion vector precision of the current picture according to the motion intensity of the coded picture set and the quantization parameter of the current picture and according to a preset policy specifically includes:

determining the motion vector precision of the current picture according to the motion intensity of the coded picture set, the quantization parameter of the current picture, and the reference parameter, and according to the preset policy.

With reference to the third aspect, in a tenth possible implementation of the third aspect, the first obtaining unit is specifically configured to:

obtain a quantization parameter of the current picture;

obtain a width value in a resolution of the current picture; and determine the motion vector precision of the current picture according to the width value and the quantization parameter of the current picture and according to a preset policy.

According to a fourth aspect, the present disclosure provides a video decoding apparatus, including:

a first obtaining unit, configured to obtain a current picture and motion vector precision of the current picture, where the motion vector precision includes a search step size set, and each search step size in the search step size set is less than a pixel unit;

a second obtaining unit, configured to obtain motion vector information of a current block, a prediction residual signal, a reference picture of the current block, and a search start point in the reference picture, where the current block is a current to-be-decoded picture block in the current picture, the motion vector information includes a quantity of search steps for a match block of the current block, relative to the search start point, and a search direction in the reference picture, and the prediction residual signal is used to indicate a residual between the current block and the match block;

a search unit, configured to search for the match block of the current block according to the reference picture, the search start point, the motion vector information, and the motion vector precision of the current picture; and a reconstruction unit, configured to obtain a reconstructed pixel value of the current block according to the match block and the prediction residual signal.

With reference to the fourth aspect, in a first possible implementation, the search step size set is $\{\frac{1}{2}^x\}$, where x is a positive integer.

With reference to the fourth aspect, in a second possible implementation, the search step size set is $\{y|y=\frac{1}{2}^x,$ where $x \in N+\}$; the motion vector precision further includes a threshold set, and the threshold set includes at least one threshold; and the video decoding apparatus further includes:

a determining unit, configured to determine, according to each threshold in the threshold set and the search start point, a search region corresponding to the threshold, where the search start point is located in the search region, and search step sizes in search regions corresponding to different thresholds are different elements in the search step size set; where elements in the threshold set correspond to different elements in the search step size set; and with respect to adjacent y1 and y2 sorted in the search step size set, y1<y2, and a search region corresponding to a threshold corresponding to y2 surrounds a search region corresponding to a threshold corresponding to y1 and is connected to the search region corresponding to the threshold corresponding to y1.

With reference to the second possible implementation of the fourth aspect, in a third possible implementation, the threshold set includes m1 and m2, where m1 is a positive integer multiple of 2 or is 0, m2 is a positive integer multiple of 4, and m1<m2; and the determining unit is specifically configured to:

when the search start point is located on an integer pixel or a ½ pixel, perform the following steps:

using a region in a first square as a search region corresponding to m1, where the first square is a square that uses the search start point as a center and uses 2m1*minimum pixel unit as a side length; and using a region between the first square and a second square as a search region corresponding to m2, where the second square is a square that uses the search start point as a center and uses 2m2*minimum pixel unit as a side length; or when the search start point is neither located on an integer pixel nor located on a ½ pixel, perform the following steps:

using a region in a third square as a search region corresponding to m1, where the third square is a square that uses a y2 pixel closest to the search start point as a center and uses 2m1*minimum pixel unit as a side length; and using a region between the third square and a fourth square as a search region corresponding to m2, where the fourth square is a square that uses a y3 pixel closest to the search start point as a center and uses 2m2*minimum pixel unit as a side length, and when a maximum element in the search step size set is $\frac{1}{2}^i$, $y3=\frac{1}{2}^{i-1}$; where the minimum pixel unit is a minimum element in the search step size set.

With reference to the third possible implementation of the fourth aspect, in a fourth possible implementation, the elements in the search step size set include y1 and y2, where y1<y2; the elements in the threshold set include m1 and m2; and the search unit is specifically configured to:

determine a reference search region, where a center Ce of the reference search region is located between a center Ce1 of the search region corresponding to m1 and a center Ce2 of the search region corresponding to m2, $Ce=f_1(Ce1,Ce2)$, a side length L of the reference search region is greater than a side length L1 of the search region corresponding to m1 and less than a side length L2 of the search region corresponding to m2, $L=f_2(L1,L2)$, and $f_1(x1,x2)=f_2(x1,x2)$;

determine a temporary point, where a motion vector of the temporary point relative to the search start point is the quantity of search steps and the search direction in the motion vector information, and a search step size is the minimum element in the search step size set; and when the temporary point is located outside the reference search region, determine a first quantity of steps, a second quantity of steps, and a third quantity of steps, where the quantity of search steps is a sum of the first quantity of steps, the second quantity of steps, and the third quantity of steps, a search step size actually corresponding to the first quantity of steps is y1, a search step size actually corresponding to the second quantity of steps is y2, a search step size actually corresponding to the third quantity of steps is y3, and when the maximum element in the search step size set is $\frac{1}{2}^i$, $y3=\frac{1}{2}^{i-1}$; or when the temporary point is located in the reference search region, perform the following step:

when the temporary point is located outside the search region corresponding to m1, determining a third quantity of steps and a fourth quantity of steps, where the quantity of search steps is a sum of the third quantity of steps and the fourth quantity of steps, a search step size actually corresponding to the third quantity of steps is y1, and a search step size actually corresponding to the fourth quantity of steps is y2; or when the temporary point is located in the search region corresponding to m1, determining that a search step size actually corresponding to the quantity of search steps is y1.

With reference to the second possible implementation of the fourth aspect, in a fifth possible implementation, the search step size set is $\{\frac{1}{4}, \frac{1}{8}\}$, or is $\{\frac{1}{2}, \frac{1}{4}, \frac{1}{8}\}$, or is $\{\frac{1}{4}, \frac{1}{8}, \frac{1}{16}\}$, or is $\{\frac{1}{2}, \frac{1}{4}, \frac{1}{8}, \frac{1}{16}\}$.

With reference to the fourth aspect, in a sixth possible implementation, the first obtaining unit is specifically configured to:

receive a bitstream of a video; and read the current picture and the motion vector precision of the current picture from the bitstream of the video.

With reference to the fourth aspect, in a seventh possible implementation, the first obtaining unit is specifically configured to:

receive a bitstream of a compressed video;

read the current picture from the bitstream of the compressed video;

obtain a quantization parameter of the current picture;

determine a decoded picture set, where the decoded picture set includes at least one current decoded picture;

obtain decoding information of each decoded picture in the decoded picture set, where the decoding information includes a motion vector difference of each decoding block in the decoded picture and a quantity of pixels included in each decoding block in the decoded picture, and the motion vector difference of the decoding block is used to indicate the motion vector information when the decoding block is the current block;

compute motion intensity of each decoding picture in the decoded picture set, where the motion intensity of the decoding picture is an average value of first values of all decoding blocks in the decoding picture, and the first value of the decoding block is a product of a sum of an absolute value of a horizontal component of the motion vector difference of the decoding block and an absolute value of a vertical component of the motion vector difference of the decoding block and the quantity of pixels included in the decoding block;

use a weighted average value of motion intensity of all decoding pictures in the decoded picture set as motion intensity of the decoded picture set; and obtain the motion vector precision of the current picture according to the motion intensity of the decoded picture set and the quantization parameter of the current picture and according to a preset policy.

With reference to the seventh possible implementation of the fourth aspect, in an eighth possible implementation, the first obtaining unit is further configured to:

obtain pixel values of all pixels in each decoded picture in the decoded picture set;

compute an average value of quadratic sums of differences between pixel values of pixels and pixel values of adjacent pixels thereof in the decoded picture, and use the average value as texture complexity of the decoded picture; and use a weighted average value of texture complexity of all decoded pictures in the decoded picture set as texture complexity of the decoded picture set; and the obtaining the motion vector precision of the current picture according to the motion intensity of the decoded picture set and the quantization parameter of the current picture and according to a preset policy specifically includes:

determining the motion vector precision of the current picture according to the motion intensity of the decoded picture set, the quantization parameter of the current picture, and the texture complexity of the decoded picture set, and according to the preset policy.

With reference to the fourth aspect, in a ninth possible implementation, the first obtaining unit is specifically configured to:
obtain a quantization parameter of the current picture;
obtain a width value in a resolution of the current picture; and determine the motion vector precision of the current picture according to the width value and the quantization parameter of the current picture and according to a preset policy.

It can be learned from the foregoing technical solutions that the embodiments of the present disclosure have the following advantages:

The inventors of this application find that, for a video sequence with different content features, adaptively selecting motion vector precision of a video picture in the video sequence is more helpful for coding of the video picture. For example, for a video picture with a slow motion and few texture details, when a reference picture is searched for a match block, use of a low-precision motion vector, in comparison with use of a high-precision motion vector, may reduce bits required for coding of the motion vector, reduce a motion search step in a motion estimation process and computational load in interpolation of the reference picture, and reduce a coding and decoding time. For a video picture with an intensive motion and a complex texture, when a reference picture is searched for a match block, use of a low-precision motion vector, in comparison with use of a high-precision motion vector, may obtain a match block more similar to a current block, reduce a prediction residual, and improve coding efficiency. Based on the findings, a content feature of a current picture is obtained according to the current picture in an embodiment of the present disclosure, or a content feature of a current picture is obtained according to the current picture and a coded picture in another embodiment, and further, motion vector precision that complies with the content feature of the current picture is determined. Therefore, when a reference picture of a current block is searched for a match block of the current block, the match block is searched for according to a target integer pixel and the motion vector precision.

DETAILED DESCRIPTION

Embodiments of the present disclosure provide a video coding method, a video decoding method, a video coding apparatus, and a video decoding apparatus, so that coding and decoding can be performed with reference to video features.

To make persons skilled in the art understand the technical solutions in the present disclosure better, the following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by persons of ordinary skill in the art based on the embodiments of the present disclosure without creative efforts shall fall within the protection scope of the present disclosure.

The embodiments are hereinafter described in detail separately.

In the specification, claims, and accompanying drawings of the present disclosure, the terms "first", "second", "third", "fourth", and so on are intended to distinguish between different objects but do not indicate a particular order. In addition, the terms "including", "having", and any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

The embodiments are hereinafter described in detail separately.

First, a video coding method provided by an embodiment of the present disclosure is described. The video coding method provided by this embodiment of the present disclosure is performed by a video coding apparatus. The video coding apparatus may be any apparatus that needs to output or store a video, for example, a device such as a mobile phone, a notebook computer, a tablet computer, or a personal computer.

Figure 1:
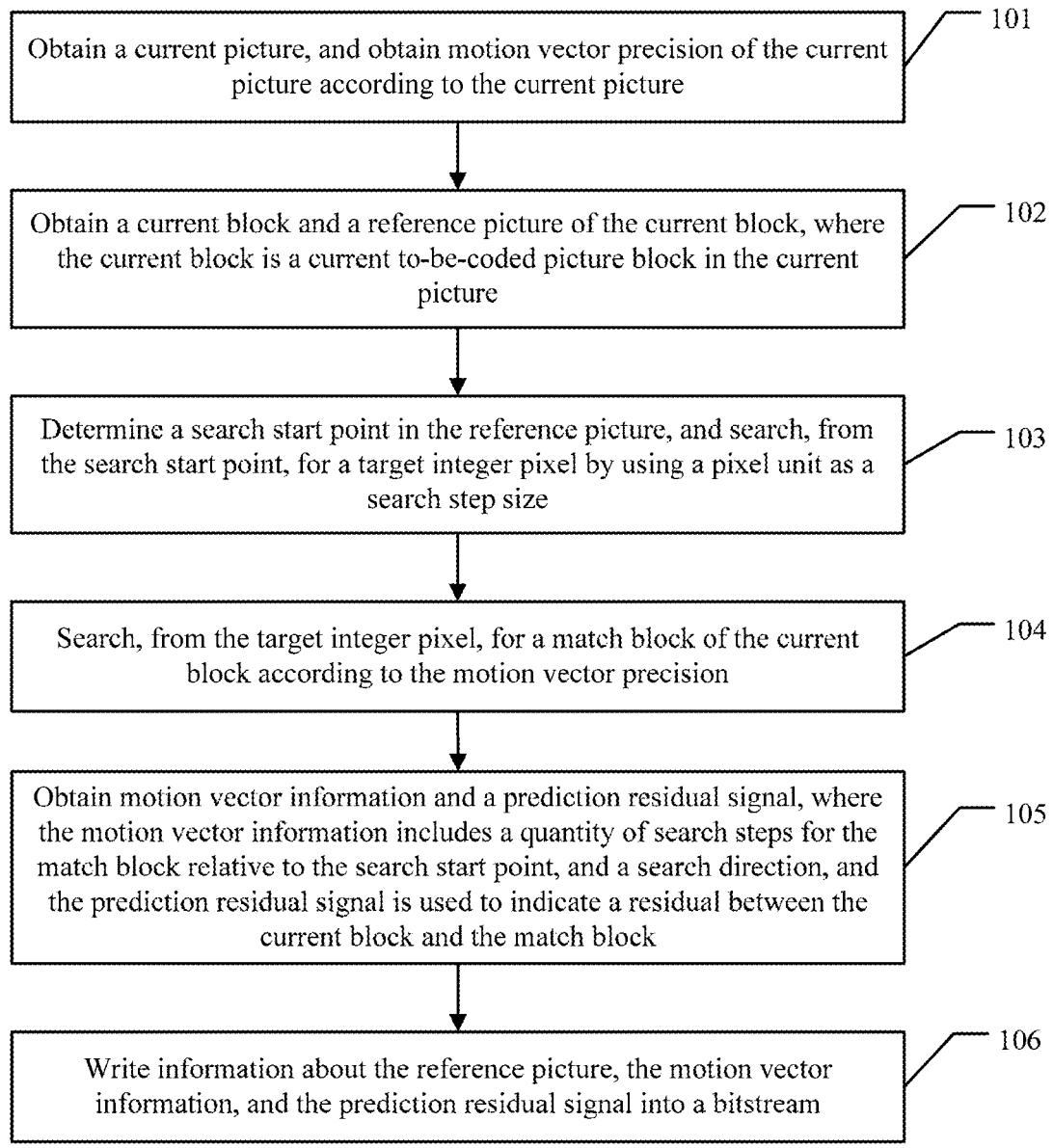
FIG. 1 is a schematic flowchart of a video coding method according to an embodiment of the present disclosure.

Referring to FIG. 1, FIG. 1 is a schematic flowchart of a video coding method according to an embodiment of the present disclosure. As shown in FIG. 1, a video coding method provided by an embodiment of the present disclosure may include the following steps:

101. Obtain a current picture, and obtain motion vector precision of the current picture according to the current picture.

There are multiple methods for obtaining the motion vector precision of the current picture according to the current picture. For example, first, a parameter that can indicate a content feature of the current picture is computed. A list is set in a video coding apparatus. Motion vector precision respectively corresponding to different parameters is stored in the list. After a parameter of the current picture is obtained, the motion vector precision of the current picture is determined according to a table search method.

In this embodiment, the motion vector precision is used to indicate a search step size when a match block of a current block is searched for from a preset start point. The preset start point is a target integer pixel in step 103. The motion vector precision includes a search step size set. The search step size set includes at least one search step size, and each search step size is less than a pixel unit.

In this embodiment, the motion vector precision may be unitary motion vector precision, or preferably, may be step-wise motion vector precisions. When the motion vector precision is a unitary motion vector precision value, the search step size set is $\{1/2^x\}$, where x is a positive integer. That is, the search step size set includes only one search step size, and the search step size is $1/2^x$ pixel unit. For example, the search step size may be $1/2$ pixel unit, $1/4$ pixel unit, $1/8$ pixel unit, or $1/16$ pixel unit. This is not limited herein.

When the motion vector precision is step-wise motion vector precisions, the search step size set is $\{y|y=1/2^x,$ where x is a positive integer$\}$. That is, the search step size set includes at least one search step size, and a value of each search step size is equal to $1/2^x$. That is, each search step size is $1/2^x$ pixel unit, and values of x corresponding to different search step sizes are different. The motion vector precision further includes a threshold set, and the threshold set includes at least one threshold. Each threshold is used to indicate a search region in a reference picture. Each search step size in the search step size set in the motion vector precision corresponds to each threshold in the threshold set on a one-to-one basis. In the search region indicated by each threshold, a search step size corresponding to the threshold is used as a search step size.

102. Obtain a current block and a reference picture of the current block, where the current block is a current to-be-coded picture block in the current picture.

The current block is the current to-be-coded picture block in the current picture. When the current block is encoded, a block most similar to the current block is found from the reference picture according to a match rule, and the block is referred to as a match block of the current block. Therefore, the reference picture of the current block needs to be determined. There are multiple determining methods. This is the related art, and is not further described herein.

103. Determine a search start point in the reference picture, and search, from the search start point, for a target integer pixel by using a pixel unit as a search step size.

There are multiple methods for determining the search start point in the reference picture. For example, in an inter-picture prediction mode used in HEVC, namely, in an Inter mode, a motion vector predictor (MVP) set of the current block may be obtained by using an advanced motion vector prediction (AMVP) method, and then an MVP with a minimum rate-distortion cost in the MVP set is used as an MVP of the current block. Certainly, there are other methods for determining the MVP of the current block in an actual application. This is the related art, and is not further described herein. A position to which the MVP points in the reference picture is a position of a predicted match block of the current block in the reference picture.

However, the predicted match block to which the MVP points is actually not the match block that is most similar to the current block in the reference picture. To reduce a computed residual between the current block and the match block, the position of the predicted match block to which the MVP points is further used as a search start point, and the reference picture is further searched for a position of the match block of the current picture.

After the search start point in the reference picture is determined, the search start point is used as a start point, and an integer pixel motion search is performed by using a pixel unit as a search step size. There are multiple methods for performing the integer pixel motion search, for example, a diamond search method, a full search method, or a fast search method. The methods are the related art, and are not further described herein. During the search, a found integer pixel with a minimum rate-distortion cost is used as a target integer pixel.

104. Search, from the target integer pixel, for a match block of the current block according to the motion vector precision.

After the target integer pixel is obtained, the target integer pixel is used as a start point to search for the match block of the current block according to the search step size in the search step size set included in the motion vector precision. In an actual application, a point in an upper left corner of the match block is generally used to search for the match block, or certainly another point in the match block may be used to search for the match block. This is not limited herein. Assuming that the motion vector precision is unitary motion vector precision, the following describes the process of searching for the match block.

Specifically, when the motion vector precision is unitary motion vector precision, that is, when only one element in the search step size set in the motion vector precision is $\frac{1}{2^x}$, the searching for a match block specifically includes:

using the target integer pixel as a start point;

setting an initial value of j to 1, and performing a preset step:

obtaining a target $\frac{1}{2^j}$ pixel from all $\frac{1}{2^j}$ pixels that are adjacent to the start point; and determining whether j is equal to x, and if j is equal to x, determining a position of the target $\frac{1}{2^j}$ pixel as a position of the match block; or if j is not equal to x, using the target $\frac{1}{2^j}$ pixel as a start point, and after adding 1 to the value of j, repeating the preset step.

Specifically, for example, when the search step size in the motion vector precision is 1/8 pixel unit, eight adjacent 1/2 pixels surrounding the target integer pixel are searched for, and one of the 1/2 pixels is determined as a target 1/2 pixel according to a preset principle. The preset principle may be selecting a pixel with a minimum rate-distortion cost, or another principle. This is not limited herein. The target 1/2 pixel is used as a start point to search for eight adjacent 1/4 pixels surrounding the target 1/2 pixel, and one of the 1/4 pixels is determined as a target 1/4 pixel according to the preset principle. The target 1/4 pixel is used as a start point to search for eight adjacent 1/8 pixels surrounding the target 1/4 pixel, and one of the 1/8 pixels is determined as a target 1/8 pixel according to the preset principle. A position of the target 1/8 pixel is the position of the match block.

105. Obtain motion vector information and a prediction residual signal, where the motion vector information includes a quantity of search steps for the match block relative to the search start point, and a search direction, and the prediction residual signal is used to indicate a residual between the current block and the match block.

After the match block is obtained, the motion vector information of the match block relative to the search start point, that is, the quantity of search steps for the match block relative to the search start point, and the search direction, may be computed according to the position of the match block and a position of the search start point.

After the match block is obtained, a difference between a pixel value of each pixel on the match block and a pixel value of each pixel on the current block may be computed, and the prediction residual signal between the match block and the current block is obtained.

106. Write information about the reference picture, the motion vector information, and the prediction residual signal into a bitstream.

In this embodiment, the information about the reference picture is used to indicate the reference picture, so that a video decoding apparatus may determine the reference picture from decoding pictures according to the information about the reference picture. For example, the information about the reference picture may be an index of the reference picture. This is not limited herein.

After receiving a bitstream of a video, the video decoding apparatus may determine the position of the search start point in the reference picture according to the information about the reference picture and information about the search start point when decoding the current block. Because the motion vector information does not indicate a step size corresponding to each search step in the quantity of search steps, the video decoding apparatus needs to further obtain motion vector precision of the current block, namely, a search step size, so that the video decoding apparatus can determine the position of the match block according to the quantity of search steps for the match block relative to the search start point, the search direction, and the search step size.

Therefore, when the current block is encoded, the information about the reference picture of the current block, the motion vector information, the prediction residual signal, information about the motion vector precision, and the information about the search start point need to be written into the bitstream.

The information about the motion vector precision is used to indicate the motion vector precision. For example, a motion vector precision set is preset in both the video coding apparatus and the video decoding apparatus. The information about the motion vector precision is specifically an index of the motion vector precision, so that the video decoding apparatus finds the motion vector precision of the current picture from the motion vector precision set according to the information about the motion vector precision. Alternatively, the information about the motion vector precision may be a specific value of the motion vector precision. This is not limited herein.

The information about the search start point is used to indicate the search start point. For example, the information about the search start point is a motion vector of the search start point relative to the current block. This is not limited herein.

However, because the video decoding apparatus may also compute the motion vector precision of the current picture by using the same method, when encoding the current block, the video coding apparatus may alternatively not write the motion vector precision of the current picture into the bitstream, so as to reduce a quantity of bits required for encoding the current block, and the video decoding apparatus performs computation by itself.

Alternatively, because the video decoding apparatus may obtain, by using the same method, the MVP of the current block, namely, the position of the search start point, for example, the H.264 standard specifies that an encoder and a decoder obtain an MVP by using a same method, when encoding the current block, the video coding apparatus may alternatively not write the information about the search start point into the bitstream, so as to reduce a quantity of bits required for encoding the current block, and the video decoding apparatus obtains the search start point by itself.

The inventors of this application find that, for a video sequence with different content features, adaptively selecting motion vector precision of a video picture in the video sequence is more helpful for coding of the video picture. For example, for a video picture with a slow motion and few texture details, when a reference picture is searched for a match block, use of a low-precision motion vector, in comparison with use of a high-precision motion vector, may reduce bits required for coding of the motion vector, reduce a motion search step in a motion estimation process and computational load in interpolation of the reference picture, and reduce a coding and decoding time. For a video picture with an intensive motion and a complex texture, when a reference picture is searched for a match block, use of a low-precision motion vector, in comparison with use of a high-precision motion vector, may obtain a match block more similar to a current block, reduce a prediction residual, and improve coding efficiency. Based on the findings, in this embodiment of the present disclosure, a content feature of a current picture is obtained according to the current picture, and further, motion vector precision that complies with the content feature of the current picture is determined. Therefore, when a reference picture of a current block is searched for a match block of the current block, the match block is searched for according to a target integer pixel and the motion vector precision.

Optionally, in some possible implementations of the present disclosure, the motion vector precision of the current picture is step-wise motion vector precisions, that is, the search step size set is $\{y|y=\frac{1}{2}^x$, where x is a positive integer$\}$; and the motion vector precision further includes a threshold set, and the threshold set includes at least one threshold. Before step 104, the method further includes: determining, according to each threshold in the threshold set and the search start point, a search region corresponding to the threshold. The search start point is located in the search region, and a search step size in the search region corresponding to each threshold corresponds to each element in the search step size set on a one-to-one basis. When the threshold set includes at least two elements, with respect to adjacent step sizes y1 and y2 sorted in the search step size set, y1<y2, and a search region corresponding to a threshold corresponding to y2 surrounds a search region corresponding to a threshold corresponding to y1 and is connected to the search region corresponding to the threshold corresponding to y1.

There are multiple possibilities of values for the search step size set. For example, the search step size set is $\{\frac{1}{4}, \frac{1}{8}\}$, or is $\{\frac{1}{2}, \frac{1}{4}, \frac{1}{8}\}$, or is $\{\frac{1}{4}, \frac{1}{8}, \frac{1}{16}\}$, or is $\{\frac{1}{2}, \frac{1}{4}, \frac{1}{8}, \frac{1}{16}\}$. This is not limited herein.

The search region corresponding to the threshold may be in multiple shapes. An example in which a shape of the search region is a square is hereinafter used for description.

The search step size set is $\{y1, y2\}$, and the threshold set is $\{m1, m2\}$, where y1<y2, m1<m2, y1 corresponds to m1, y2 corresponds to m2, m1 is a positive integer multiple of 2 or 0, and m2 is a positive integer multiple of 4. The determining, according to each threshold in the threshold set and the search start point, a search region corresponding to the threshold includes:

when the search start point is located on an integer pixel or a ½ pixel, performing the following steps:

using a region in a first square as a search region corresponding to m1, where the first square is a square that uses the search start point as a center and uses 2m1*minimum pixel unit as a side length; and using a region between the first square and a second square as a search region corresponding to m2, where the second square is a square that uses the search start point as a center and uses 2m2*minimum pixel unit as a side length; or when the search start point is neither located on an integer pixel nor located on a ½ pixel, performing the following steps:

using a region in a third square as a search region corresponding to m1, where the third square is a square that uses a y2 pixel closest to the search start point as a center and uses 2m1*minimum pixel unit as a side length; and using a region between the third square and a fourth square as a search region corresponding to m2, where the fourth square is a square that uses a y3 pixel closest to the search start point as a center and uses 2m2*minimum pixel unit as a side length, and when a maximum element in the search step size set is $\frac{1}{2}^i$, $y3=\frac{1}{2}^{i-1}$; where the minimum pixel unit is a minimum element in the search step size set.

For ease of understanding, an example in which y1=⅛, y2=¼, m1=2, and m2=4 is hereinafter used for description.

Figure 2:
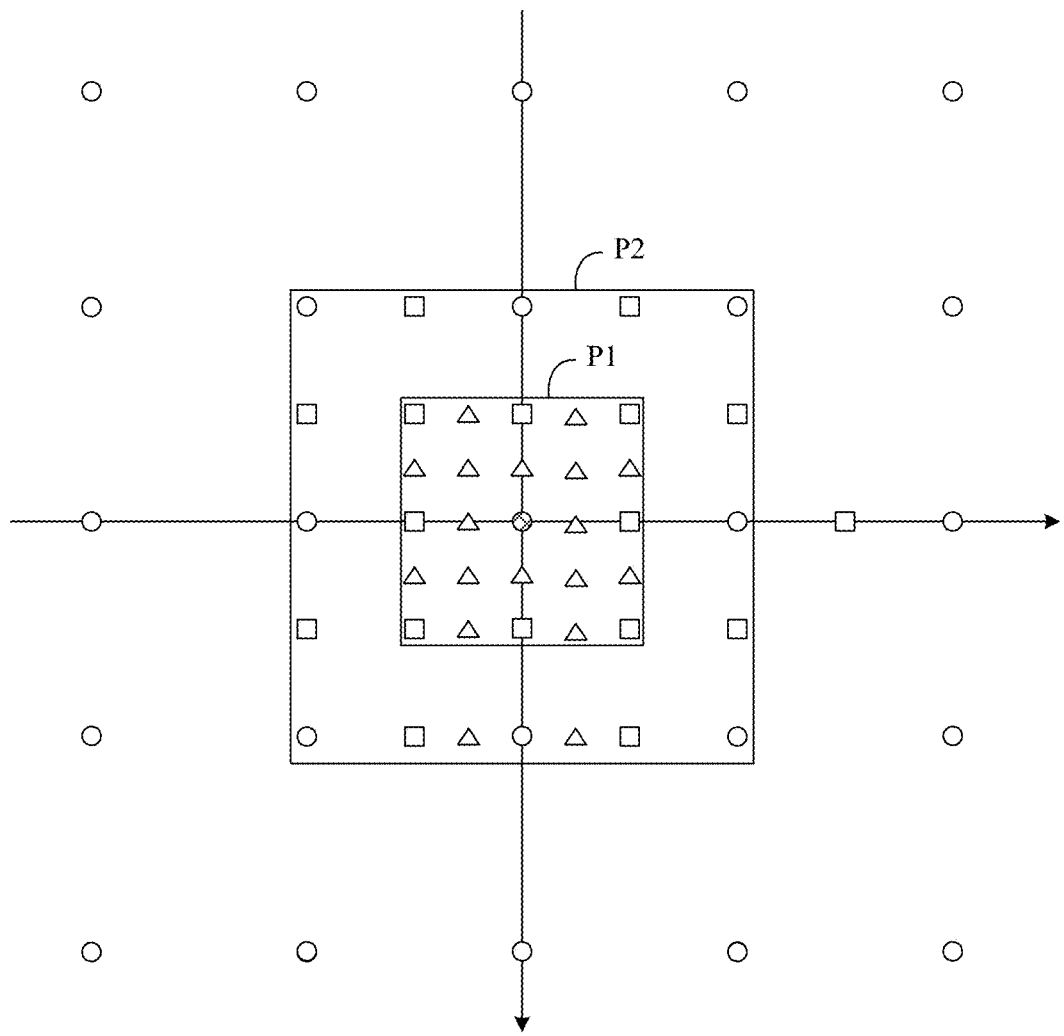
FIG. 2 and FIG. 3 are respectively schematic structural diagrams of search regions in a video coding method according to the present disclosure.
Figure 3:
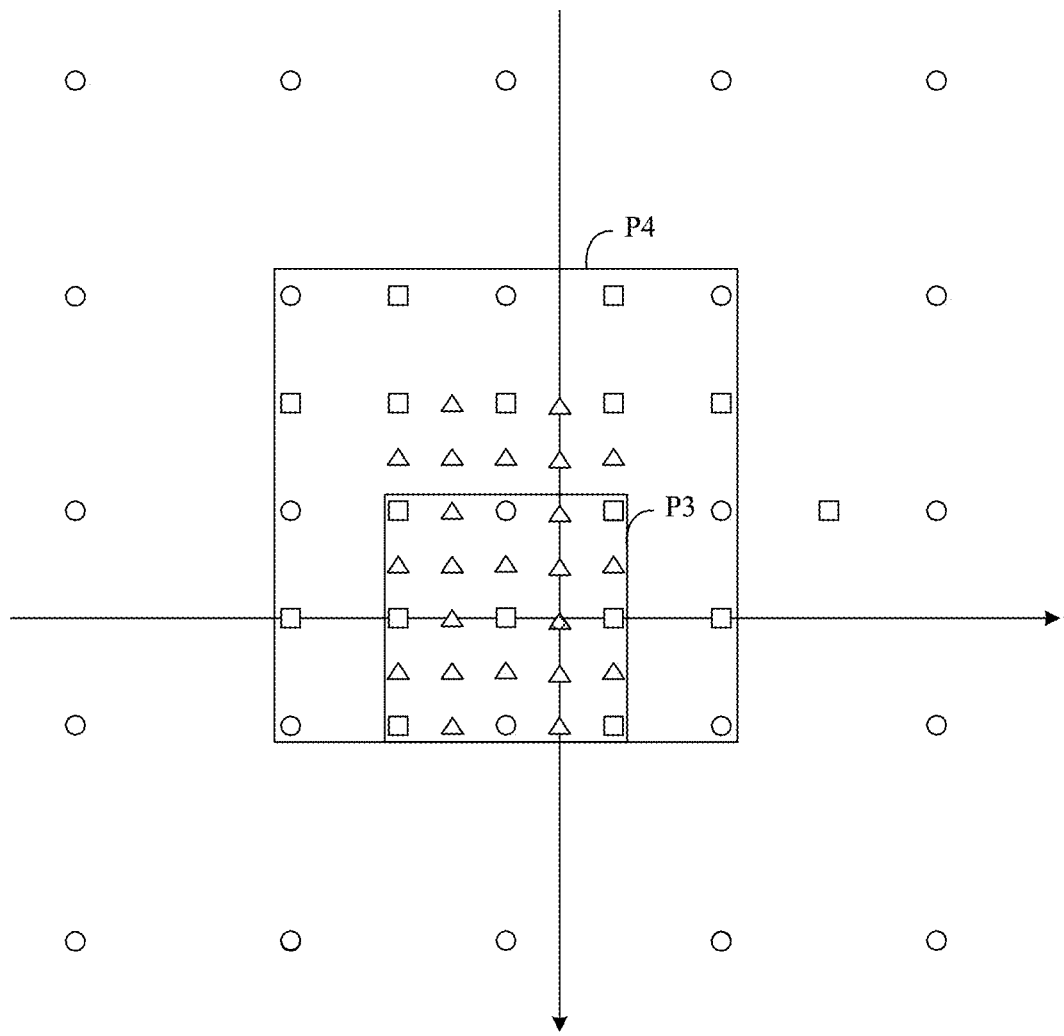

Referring to FIG. 2 and FIG. 3, FIG. 2 and FIG. 3 are respectively schematic structural diagrams of search regions in a video coding method according to the present disclosure. As shown in FIG. 2, a circular block is a ½ pixel, a square block is a ¼ pixel, and a triangular block is a ⅛ pixel. The search start point (marked with a shadow block in the figure) is located on a ½ pixel. In this case:

the first square (marked with P1 in the figure) is a square that uses the search start point as a center and uses 2*2*minimum pixel unit (namely, ⅛ pixel unit)=½ pixel unit as a side length; and the second square (marked with P2 in the figure) is a square that uses the search start point as a center and uses 2*4*minimum pixel unit (namely, ⅛ pixel unit)=1 pixel unit as a side length.

The search region corresponding to m1 is the first square, and a search step size used when a search is performed in the search region is ⅛ pixel unit. The search region corresponding to m2 is a region between the first square and the second square, and a search step size used when a search is performed in the search region is ¼ pixel unit.

As shown in FIG. 3, a circular block is a ½ pixel, a square block is a ¼ pixel, and a triangular block is a ⅛ pixel. The search start point (marked with a shadow block in the figure) is located on a ⅛ pixel. In this case:

the third square (marked with P3 in the figure) is a square that uses a ¼ pixel closest to the search start point as a center and uses 2*2*minimum pixel unit (namely, ⅛ pixel unit)=½ pixel unit as a side length; and the fourth square (marked with P4 in the figure) is a square that uses a ½ pixel closest to the search start point as a center and uses 2*4*minimum pixel unit (namely, ⅛ pixel unit)=1 pixel unit as a side length.

The search region corresponding to m1 is the third square, and a search step size used when a search is performed in the search region is ⅛ pixel unit. The search region corresponding to m2 is a region between the third square and the fourth square, and a search step size used when a search is performed in the search region is ¼ pixel unit.

At least one y2 pixel and at least one y3 pixel are closest to the search start point, and any y2 pixel and any y3 pixel may be selected as the center of the third square P3 and the center of the fourth square P4 respectively. Preferably, a y2 pixel and a y3 pixel that are located on a same side of the search start point are selected as the center of the third square P3 and the center of the fourth square P4 respectively, so as to avoid that the third square P3 cannot be completely located in the fourth square P4.

In the foregoing embodiment, an example in which the shape of the search region is a square is used for description. In an actual application, the shape of the search region may also be a circle, a regular hexagon, or another shape. This is not limited herein.

Further, optionally, in some possible implementations of the present disclosure, the searching, from the target integer pixel, for a match block according to the motion vector precision in step 104 includes:

S1. Obtain a current start point according to the target integer pixel.

S2. Obtain all y2 pixels adjacent to the current start point.

S3. When all the y2 pixels are located outside the search region corresponding to m2, determine a position of the current start point as a position of the match block.

S4. When at least a part of all the y2 pixels are located in the search region corresponding to m2, perform the following steps:

S5. Obtain a target y2 pixel from the y2 pixels located in the search region corresponding to m2.

S6. Obtain all y1 pixels adjacent to the target y2 pixel.

S7. When all the y1 pixels are located outside the search region corresponding to m1, determine a position of the target y2 pixel as a position of the match block.

S8. When at least a part of all the y1 pixels are located in the search region corresponding to m1, obtain a target y1 pixel from the y1 pixels located in the search region corresponding to m1, and determine a position of the target y1 pixel as a position of the match block.

How to obtain the current start point according to the target integer pixel in step S1 depends on a value of y2. For example, when y2=¼, first, all adjacent ½ pixels surrounding the target integer pixel are searched for; and then a target ½ pixel is determined from the ½ pixels according to a preset principle (for example, a pixel with a minimum rate-distortion cost is selected), and the target ½ pixel is used as the current start point. When y2=⅛, first, a target ½ pixel is obtained according to the target integer pixel; all adjacent ¼ pixels surrounding the target ½ pixel are searched for; and then a target ¼ pixel is determined from the ¼ pixels according to a preset principle (for example, a pixel with a minimum rate-distortion cost is selected), and the target ¼ pixel is used as the current start point. Likewise, when y2=1/16, a target ⅛ pixel may be obtained as the current start point, and so on.

For better understanding and implementing the foregoing solution of the embodiment of the present disclosure, the following uses some specific application scenarios as examples for description.

Figure 4:
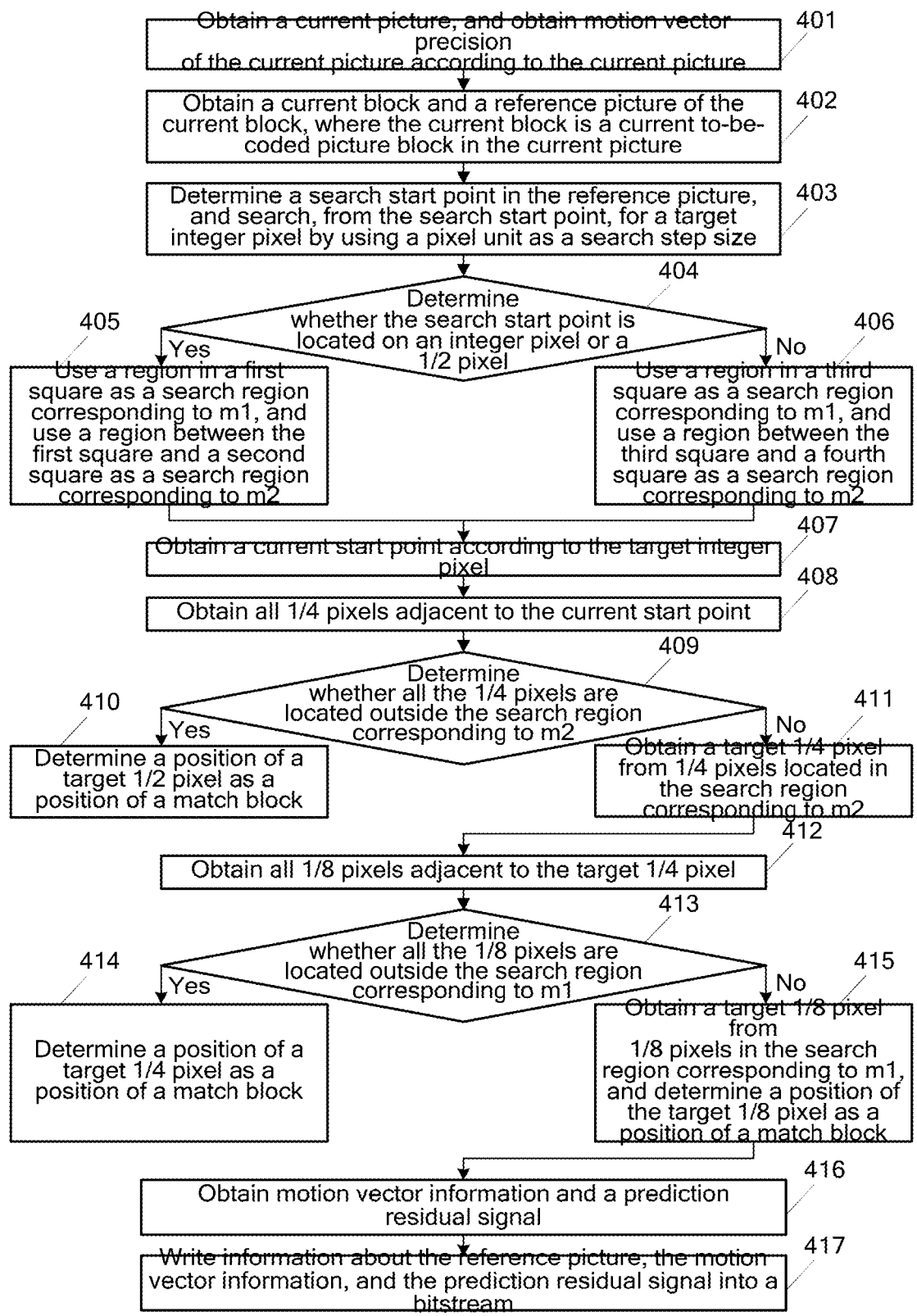
FIG. 4 is a schematic flowchart of another embodiment of a video coding method according to the present disclosure.

Referring to FIG. 4, FIG. 4 is a schematic flowchart of another embodiment of a video coding method according to the present disclosure. In this embodiment, the video coding method includes the following steps.

401. Obtain a current picture, and obtain motion vector precision of the current picture according to the current picture.

The motion vector precision specifically includes a search step size set {⅛, ¼} and a threshold set {m1, m2}.

402. Obtain a current block and a reference picture of the current block, where the current block is a current to-be-coded picture block in the current picture.

403. Determine a search start point in the reference picture, and search, from the search start point, for a target integer pixel by using a pixel unit as a search step size.

404. Determine whether the search start point is located on an integer pixel or a ½ pixel.

If yes, step 405 is performed.
If no, step 406 is performed.

405. Use a region in a first square as a search region corresponding to m1, and use a region between the first square and a second square as a search region corresponding to m2.

The first square is a square that uses the search start point as a center and uses 2m1*minimum pixel unit as a side length. The second square is a square that uses the search start point as a center and uses 2m2*minimum pixel unit as a side length. The minimum pixel unit is a minimum element in the search step size set.

406. Use a region in a third square as a search region corresponding to m1, and use a region between the third square and a fourth square as a search region corresponding to m2.

The third square is a square that uses a ¼ pixel closest to the search start point as a center and uses 2m1*minimum pixel unit as a side length. The fourth square is a square that uses a ½ pixel closest to the search start point as a center and uses 2m2*minimum pixel unit as a side length. The minimum pixel unit is a minimum element in the search step size set.

For ease of description, it is assumed that a motion vector $Ce(Ce_x, Ce_y)$ points to the center of the third square, and that a motion vector $Cq$ $(Cq_x, Cq_y)$ points to the center of the fourth square. Specifically, $Ce$ $(Ce_x, Ce_y)$ and $Cq$ $(Cq_x, Cq_y)$ may be computed separately by using the following two formulas:

$$Ce_x = \lfloor \lfloor MVP_x/2 \rfloor \times 2 \rfloor, Ce_y = \lfloor \lfloor MVP_y/2 \rfloor \times 2 \rfloor \text{ and}$$

$$Cq_x = \lfloor \lfloor MVP_x+1)/2 \rfloor \times 2, Cq_y = \lfloor \lfloor (MVP_y+1)/2 \rfloor \times 2 \rfloor.$$

where $MVP_x$ is a component of an MVP of the current block in a horizontal direction, and $MVP_x$ is a component of the MVP of the current block in a vertical direction.

407. Obtain a current start point according to the target integer pixel.

All adjacent ½ pixels surrounding the target integer pixel are searched for; and then a target ½ pixel is determined from the ½ pixels according to a preset principle (for example, a pixel with a minimum rate-distortion cost is selected), and the target ½ pixel is used as the current start point.

408. Obtain all ¼ pixels adjacent to the current start point.

409. Determine whether all the ¼ pixels are located outside the search region corresponding to m2, and if yes, perform step 410, or else, perform step 411.

Specifically, whether all the ¼ pixels are located outside the search region corresponding to m2 is determined by using a formula (1):

$$|MV'_{quater\_x} - Cq_x| > m2 \text{ or } |MV'_{quater\_y} - Cq_y| > m2 \quad (1)$$

where $MV_{quater}^I$ is a motion vector of each ¼ pixel relative to the current block in a same position in the reference frame, $MV_{quater}^I$ is a horizontal component of $MV_{quater}^I$, and $MV_{quater}^I$ is a vertical component of $MV_{quater}^I$. When all the ¼ pixels satisfy the formula (1), step 410 is performed. If at least one ¼ pixel does not satisfy the formula (1), step 411 is performed.

410. Determine a position of a target ½ pixel as a position of the match block.

Specifically, a motion vector MVD of the match block relative to the search start point may be computed by using the following formula. In the following formula, $MVD_x$ is a component of the MVD in the horizontal direction, $MVD_y$ is a component of the MVD in the vertical direction, and $MV_{half}$ is a motion vector of the target ½ pixel relative to the current block in the same position in the reference frame.

When $|MV_{half\_x} - Cq_x| > THq$, whether a position to which $MV_{half}$ points is on the left or right of $Cq$ is determined.

If the position is on the left, $MVD_x$ is computed by using the following formula:

$$MVD_x = Ce_x - TH_e + ((Cq_x - THq) - (Ce_x - THe))/2 + (MV_{half\_x} - (Cq_x - THq))/4 - MVP_x, MVD_y = (MV_{half\_y} - Cq_y)/4$$

If the position is on the right, $MVD_x$ is computed by using the following formula:

$$MVD_x = Ce_x + TH_e + ((Cq_x + THq) - (Ce_x - THe))/2 + (MV_{half\_x} - (Cq_x + THq))/4 - MVP_x, MVD_y = (MV_{half\_y} - Cq_y)/4$$

Otherwise, when $|MV_{half\_y} - Cq_y| > THq$, whether a position to which $MV_{half}$ points is above or below $Cq$ is determined.

If the position is above Cq, $MVD_y$ is computed by using the following formula:

$$MVD_y = Ce_y - TH_e + ((Cq_y - THq) - (Ce_y - THe))/2 + (MV_{halfy} - (Cq_y - THq))/4 - MVP_y, MVD_x = (MV_{halfx} - Cq_y)/4$$

If the position is below Cq, $MVD_y$ is computed by using the following formula:

$$MVD_y = Ce_y - TH_e + ((Cq_y - THq) - (Ce_y + THe))/2 + (MV_{halfy} - (Cq_y + THq))/4 - MVP_x, MVD_x = (MV_{halfx} - Cq_x)/4$$

411. Obtain a target ¼ pixel from ¼ pixels located in the search region corresponding to m2.

Specifically, all ¼ pixels in the search region corresponding to m2 may be traversed, and the target ¼ pixel is determined according to a preset principle (for example, a pixel with a minimum rate-distortion cost is selected).

412. Obtain all ⅛ pixels adjacent to the target ¼ pixel.

413. Determine whether all the ⅛ pixels are located outside the search region corresponding to m1, and if yes, perform step 414, or else, perform step 415.

Specifically, whether all the ⅛ pixels are located outside the search region corresponding to m1 is determined by using a formula (2):

$$|MV'_{eight\ x} - Ce_x| > m1 \text{ or } |MV'_{eight\ y} - Ce_y| > m1 \quad (2)$$

where $MV_{eight}^I$ is a motion vector of each ⅛ pixel relative to the current block, $MV_{eightx}^I$ is a horizontal component of $MV_{eight}^I$, and $MV_{eighty}^I$ is a vertical component of $MV_{eight}^I$. When all the ⅛ pixels satisfy the formula (2), step 414 is performed. If at least one ⅛ pixel does not satisfy the formula (2), step 415 is performed.

414. Determine a position of the target ¼ pixel as a position of the match block.

Specifically, the motion vector MVD of the match block relative to the search start point may be computed by using the following formula. In the following formula, $MVD_x$ is a component of the MVD in the horizontal direction, $MVD_y$ is a component of the MVD in the vertical direction, and $MV_{quater}$ is a motion vector of the target ¼ pixel relative to the current block in the same position in the reference frame.

When $|MV_{quater\ x} - Ce_x| > THq$, whether a position to which $MV_{quater}$ points is on the left or right of Ce is determined.

If the position is on the left, $MVD_x$ is computed by using the following formula:

$$MVD_x = Ce_x - TH_e + (MV_{quater\ x} - (Ce_x - THe))/2 - MVP_x, MVD_y = (MV_{quater\ y} - Ce_y)/2$$

If the position is on the right $MVD_x$ is computed by using the following formula:

$$MVD_x = Ce_x + TH_e + (MV_{quater\ x} - (Ce_x + THe))/2 - MVP_x, MVD_y = (MV_{quater\ y} - Ce_y)/2$$

Otherwise, when $|MV_{quater\ y} - Ce_y| > THe$, whether a position to which points is above or below Ce is determined.

If the position is above Ce, $MVD_y$ is computed by using the following formula:

$$MVD_y = Ce_y - TH_e + (MV_{quater\ y} - (Ce_y - THe))/2 - MVP_y, MVD_x = (MV_{quater\ x} - Ce_x)/2$$

If the position is below Ce, $MVD_y$ is computed by using the following formula:

$$MVD_y = Ce_y + TH_e + (MV_{quater\ y} - (Ce_y + THe))/2 - MVP_y, MVD_x = (MV_{quater\ x} - Ce_x)/2$$

415. Obtain a target ⅛ pixel from ⅛ pixels in the search region corresponding to m1, and determine a position of the target ⅛ pixel as a position of the match block.

Specifically, the motion vector MVD of the match block relative to the search start point may be computed by using the following formula:

$$MVD_x = MV_{eightx} - MVP_x, MVD_y = MV_{eighty} - MVP_y.$$

416. Obtain motion vector information and a prediction residual signal.

The motion vector information includes a quantity of search steps for the match block relative to the search start point, and a search direction, and the prediction residual signal is used to indicate a residual between the current block and the match block.

417. Write information about the reference picture, the motion vector information, and the prediction residual signal into a bitstream.

In this embodiment of the present disclosure, the motion vector precision of the current picture is obtained according to the current picture. In an actual application, there are multiple methods for obtaining the motion vector precision of the current picture according to the current picture.

Optionally, in some possible implementations of the present disclosure, the obtaining motion vector precision of the current picture according to the current picture includes: obtaining a quantization parameter of the current picture; obtaining a width value in a resolution of the current picture; and determining the motion vector precision of the current picture according to the width value and the quantization parameter of the current picture and according to a preset policy. The preset policy may be a table search method, or is a threshold method, or is computing a decision factor by using a formula, and selecting the motion vector precision of the current picture according to a result of comparison between the decision factor and a preset value, or is another policy. This is not limited herein.

For example, the preset policy is a table search method. The following Table 1 is prestored in a video coding apparatus. A first row in Table 1 indicates a range of values of the quantization parameter of the current picture, and a first column indicates a range of width values in the resolution of the current picture. After the width value in the resolution of the current picture and the quantization parameter of the current picture are obtained, Table 1 is searched for the motion vector precision of the current picture.

TABLE 1

|  | <25 | 25 to 30 | 30 to 35 | 35 to 40 | >40 |
| --- | --- | --- | --- | --- | --- |
| <1 | (2, 8) | (0, 8) | (0, 4) | (0, 4) | (0, 4) |
| 1 to 2 | (4, 8) | (0, 8) | (0, 8) | (0, 4) | 1/2 |
| 2 to 4 | (0, 8) | (0, 8) | (0, 4) | (0, 4) | 1/2 |
| 4 to 6 | (0, 4) | (0, 4) | (0, 4) | (0, 4) | 1/2 |
| 6 to 8 | (0, 8) | 1/2 | 1/2 | 1/2 | 1/2 |
| >8 | 1/2 | 1/2 | 1/2 | 1/2 | 1/2 |

Optionally, in some possible implementations of the present disclosure, due to motion continuity, a content feature of the current picture may be further obtained according to a coded picture set and the current picture, and further, the motion vector precision of the current picture is determined according to the content feature. The coded picture set includes at least one coded picture. Each coded picture in the coded picture set may be a coded picture adjacent to the current picture in a video sequence, or may be a coded picture that is separated from the current picture by at least one picture. This is not limited herein.

Further, optionally, in some possible implementations of the present disclosure, the obtaining motion vector precision of the current picture according to the current picture and the coded picture set includes:

S10. Obtain a quantization parameter of the current picture and a coded picture set.

S11. Obtain coding information of each coded picture in the coded picture set.

In this embodiment, the coded picture set includes at least one coded picture. Preferably, there is only one element in the coded picture set, and the element is a coded picture temporally adjacent to the current picture. Because a content feature of the coded picture temporally adjacent to the current picture is similar to that of the current picture, using the coded picture to obtain the motion vector precision of the current picture can make the motion vector precision of the current picture more compliant with the content feature of the current picture. In addition, because the coded picture set includes only one element, computational load can be reduced.

The coding information includes a motion vector difference of each coding block in the coded picture and a quantity of pixels included in each coding block in the coded picture, and the motion vector difference of the coding block is used to indicate the motion vector information when the coding block is the current block. That is, when the coding block is the current block, the motion vector difference of the coding block is a motion vector of the match block of the coding block, relative to the search start point in the reference picture of the coding block.

S12. Compute motion intensity of each coded picture in the coded picture set.

The motion intensity of the coded picture is a weighted average value of first values of all coding blocks in the coded picture, and a first value of each coding block is a product of a sum of an absolute value of a horizontal component of the motion vector difference of the coding block and an absolute value of a vertical component of the motion vector difference of the coding block and the quantity of pixels included in the coding block.

Specifically, M is used to indicate the motion intensity of the coded picture, $mvd_x$ is used to indicate the horizontal component of the motion vector difference of the coding block, $mvd_y$ is used to indicate the vertical component of the motion vector difference of the coding block, and pusize is used to indicate the quantity of pixels included in the coding block. In this case, $$M = \frac{1}{n} \sum (|mvd_x| + |mvd_y|) \times pusize$$

S13. Use a weighted average value of motion intensity of all coded pictures in the coded picture set as motion intensity of the coded picture set.

Specifically, weighted values of motion intensity of all the coded pictures may be the same or may be different. This is not limited herein.

S14. Determine the motion vector precision of the current picture according to the motion intensity of the coded picture set and the quantization parameter of the current picture and according to a preset policy.

The preset policy may be a table search method, or is a threshold method, or is computing a decision factor by using a formula, and selecting the motion vector precision of the current picture according to a result of comparison between the decision factor and a preset value, or is another policy. This is not limited herein.

For example, the preset policy is a table search method. The following Table 2 is prestored in the video coding apparatus. A first row in Table 2 indicates a range of values of the quantization parameter of the current picture, and a first column indicates a range of values of motion intensity of the coded picture set. After the motion intensity of the coded picture set and the quantization parameter of the current picture are obtained, Table 2 is searched for the motion vector precision of the current picture.

TABLE 2

|  | <25 | 25 to 30 | 30 to 35 | 35 to 40 | >40 |
| --- | --- | --- | --- | --- | --- |
| <1 | (2, 8) | (0, 8) | (0, 4) | (0, 4) | (0, 4) |
| 1 to 2 | (4, 8) | (0, 8) | (0, 8) | (0, 4) | 1/2 |
| 2 to 4 | (0, 8) | (0, 8) | (0, 4) | (0, 4) | 1/2 |
| 4 to 6 | (0, 4) | (0, 4) | (0, 4) | (0, 4) | 1/2 |
| 6 to 8 | (0, 8) | 1/2 | 1/2 | 1/2 | 1/2 |
| >8 | 1/2 | 1/2 | 1/2 | 1/2 | 1/2 |

Further, optionally, in some possible implementations of the present disclosure, the obtaining motion vector precision of the current picture according to the current picture and the coded picture set includes:

S15. Obtain a reference parameter.

The reference parameter includes one of texture complexity of the current picture, texture complexity of the coded picture set, or inter-picture noise of the coded picture set, or includes inter-picture noise of the coded picture set and one of texture complexity of the current picture or texture complexity of the coded picture set.

When the reference parameter includes the texture complexity of the current picture, the obtaining a reference parameter includes:

obtaining a pixel value of each pixel in the current picture; and computing an average value of quadratic sums of differences between pixel values of pixels and pixel values of adjacent pixels thereof in the current picture, and using the average value as the texture complexity of the current picture.

Specifically, A is used to indicate the texture complexity of the current picture, and $s_{x,y}$ is used to indicate a pixel value of a pixel in the current picture, where x and y are coordinates of the pixel. In this case, $$A = \frac{1}{2n} \sum [(s_{x,y} - s_{x+1,y})^2 + (s_{x,y} - s_{x,y+1})^2].$$

When the reference parameter includes the texture complexity of the coded picture set, the obtaining a reference parameter includes:

obtaining a pixel value of each pixel in each coded picture in the coded picture set;

computing an average value of quadratic sums of differences between pixel values of pixels and pixel values of adjacent pixels thereof in the coded picture, and using the average value as texture complexity of the coded picture; and using a weighted average value of texture complexity of all coded pictures in the coded picture set as the texture complexity of the coded picture set.

Specifically, $B_i$ is used to indicate texture complexity of an $i^{th}$ coded picture, $s_{xy}$ is used to indicate a pixel value of a pixel in the coding picture, where x and y are coordinates of the pixel, and B is used to indicate the texture complexity of the coded picture set. In this case, $$B_i = \frac{1}{2n} \sum [(s_{x,y} - s_{x+1,y})^2 + (s_{x,y} - s_{x,y+1})^2], \text{ and}$$

$$B = \frac{1}{n} \sum B_i$$

When the reference parameter includes the inter-picture noise of the coded picture set, the obtaining a reference parameter includes:

obtaining a prediction error of each pixel in each coded picture in the coded picture set;

computing a second average value of each coding picture, where the second average value is an average value of absolute values of prediction residual of all pixels in the coding picture; and using a weighted average value of second average values of all coded pictures in the coded picture set as the inter-picture noise of the coded picture set.

Specifically, $N_i$ is used to indicate a prediction error of the $i^{th}$ coded picture, $s_{xy}$ is used to indicate an original pixel value of a pixel in the coded picture, $s'_{x+u,y+v}$ is used to indicate a predicted pixel value of a pixel in a corresponding position in the coded picture, where x and y are coordinates of the pixel, and N is used to indicate the texture complexity of the coded picture set. In this case, $$N_i = \frac{1}{n} \sum |s_{x,y} - s'_{x,y}|.$$

The step S14 is specifically determining the motion vector precision of the current picture according to the motion intensity of the coded picture set, the quantization parameter of the current picture, and the reference parameter, and according to the preset policy.

There are multiple preset policies. The following describes several preset policies by using examples.

Method 1:

S21. Determine an initial motion vector precision of the current picture according to the motion intensity of the coded picture set and the quantization parameter of the current picture.

For the method for obtaining the initial motion vector precision of the current picture, refer to the table search method for searching Table 2 that is described in the example in step S14.

S22. Obtain a motion vector precision set and an index of each element in the motion vector precision set.

Specifically, in this embodiment, the motion vector precision set is {½, (0, 4), (0, 8), ¼, (2, 4), (2, 8), (4, 8), ⅛}. An index value of motion vector precision in each motion vector precision set is shown in Table 3.

TABLE 3

| Motion vector precision | ½ | (0, 4) | (0, 8) | ¼ | (2, 4) | (2, 8) | (4, 8) | ⅛ |
|---|---|---|---|---|---|---|---|---|
| Index value | 0 | 1 | 2 | 3 | 4 | 5 | 6 | 7 |

S23. Compute a first ratio $R_N$, where the first ratio $R_N$ is a ratio of bits $B_N$ consumed by a prediction error of the current picture to bits $B_F$ consumed by a prediction error of the coded picture set.

S24. Compute a second ratio $R_{MVD}$, where the second ratio $R_{MVD}$ is a $B_{MVD}$ ratio of bits consumed by a motion vector difference MVD of the current picture to the bits $B_F$ consumed by the prediction error of the coded picture set.

S25. Obtain an adjustment step size offset according to $R_N$ and $R_{MVD}$.

The offset is an integer within $-1 \leq \text{Offset} \leq 3$. The offset is obtained according to the following formula, where $\lfloor \; \rfloor$ indicates a round-down function:

$$\text{Offset} = F1 - F2$$

$$F1 = \begin{cases} 3, & \frac{R_N \times QP}{7} > 3 \\ \left\lfloor \frac{R_N \times QP}{7} \right\rfloor, & \frac{R_N \times OP}{7} \leq 3 \end{cases}, F2 = \begin{cases} 1, & \frac{1}{R_{MVD} \times QP} > 30 \\ 0, & \frac{1}{R_{MVD} \times QP} \leq 30 \end{cases}.$$

S26. Adjust the initial motion vector precision according to the adjustment step size offset.

When a value of the offset is −1, 1 is added to the index value; when a value of the offset is 3, 1 is subtracted from the index value; or when a value of the offset is 0, 1, or 2, the index value remains unchanged.

Method 2:

S31. Compute a decision factor F according to the texture complexity of the current picture, the texture complexity A of the coded picture set, the inter-picture noise N of the coded picture set, and the motion intensity M of the coded picture set.

Specifically, F=12M+7N−5A. Certainly, parameters M, N, and A may also be other parameters. This is not limited herein.

In an actual application, when the decision factor F is computed, the inter-picture noise N of the coded picture set may alternatively not be used, that is, the decision factor F is computed only according to the texture complexity of the current picture or the texture complexity A of the coded picture set and the motion intensity M of the coded picture set.

Specifically, F=12M−5A. Certainly, parameters M and A may also be other parameters. This is not limited herein.

S32. Obtain thresholds Th0 and Th1 according to the quantization parameter QP of the current picture.

The thresholds Th0 and Th1 may be computed according to the following formula:

$$Th_0 = a_0 QP^2 + b_0 QP + c_0$$

$$Th_1 = a_1 QP^2 + b_1 QP + c_1$$

Specifically, coefficients a0, a1, b0, b1, c0, and c1 in the formula are −0.02, 0.57, 16, −0.03, 0.6, and 38 respectively. Certainly, the coefficients in the formula may also be other values. This is not limited herein.

S33. Compare F with the thresholds Th0 and Th1 to obtain an MVR1.

Specifically, the MVR1 may be obtained according to the following formula:

$$MVR_1 = \begin{cases} 1/8, & F < Th_0 \\ 1/4, & Th_0 \leq F < Th_1 \\ 1/2, & F \geq Th_1 \end{cases}.$$

S34. Collect statistics about distribution of absolute values of motion vector differences MVDs in the coded picture set.

Statistics about distribution probabilities of absolute values of horizontal components mvdx of the motion vector differences and absolute values of vertical components mvdy of the motion vector differences in the following five intervals are collected separately to obtain:

$$\begin{cases} P_0, |mvd| = 0 \\ P_{1,2}, 1 \leq |mvd| \leq 2 \\ P_{3,4}, 3 \leq |mvd| \leq 4 \\ P_{5,8}, 5 \leq |mvd| \leq 8 \\ P_8, |mvd| > 8 \end{cases}.$$

S35. Obtain the motion vector precision MVR of the current picture by using the following formula:

$$MVR = \begin{cases} (0, 4), MVR_1 = 1/2 \text{ and } P_0 + P_{1,2} + P_{3,4} \geq 60\% \\ (0, 8), MVR_1 = 1/2 \text{ and } P_0 + P_{1,2} + P_{3,4} < 60\% \text{ and} \\ \qquad P_0 + P_{1,2} + P_{3,4} + P_{5,8} \geq 70\% \\ 1/2, MVR_1 = 1/2 \text{ and } P_0 + P_{1,2} + P_{3,4} < 60\% \text{ and} \\ \qquad P_0 + P_{1,2} + P_{3,4} + P_{5,8} < 70\% \\ (4, 8), MVR_1 = 1/4 \text{ and } P_0 + P_{1,2} + P_{3,4} \geq 85\% \\ (2, 4), MVR_1 = 1/4 \text{ and } P_0 + P_{1,2} \geq 50\% \\ 1/4, MVR_1 = 1/4 \text{ and } P_0 + P_{1,2} + P_{3,4} < 85\% \text{ and} \\ \qquad P_0 + P_{1,2} < 50\% \\ (4, 8), MVR_1 = 1/8 \text{ and } P_0 + P_{1,2} + P_{3,4} + P_{5,8} \geq 15\% \\ 1/8, MVR_1 = 1/8 \text{ and } P_0 + P_{1,2} + P_{3,4} + P_{5,8} < 15\% \end{cases}.$$

The foregoing describes the video coding method in this embodiment of the present disclosure. The following describes a video decoding method provided by an embodiment of the present disclosure. The video decoding method provided by this embodiment of the present disclosure is performed by a video decoding apparatus. The video decoding apparatus may be any apparatus that needs to output or play a video, for example, a device such as a mobile phone, a notebook computer, a tablet computer, or a personal computer.

Figure 5:
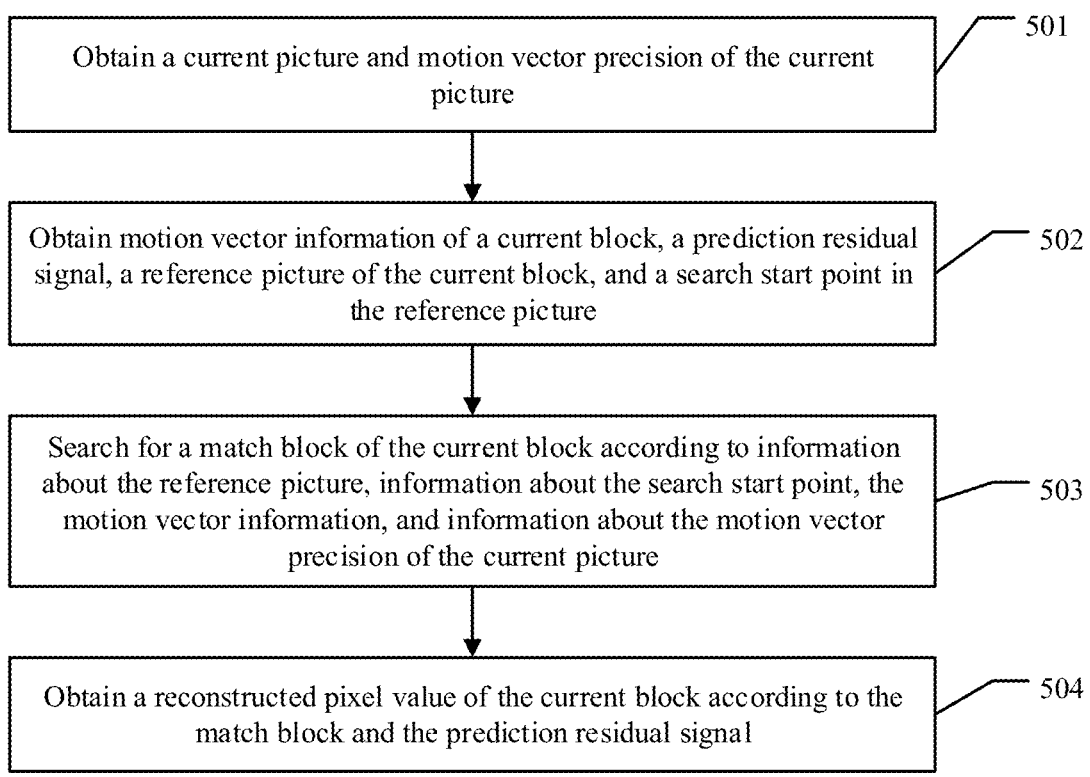
FIG. 5 is a schematic flowchart of a video decoding method according to an embodiment of the present disclosure.

Referring to FIG. 5, FIG. 5 is a schematic flowchart of a video decoding method according to an embodiment of the present disclosure. As shown in FIG. 5, a video decoding method provided by an embodiment of the present disclosure may include the following steps:

501. Obtain a current picture and motion vector precision of the current picture.

502. Obtain motion vector information of a current block, a prediction residual signal, a reference picture of the current block, and a search start point in the reference picture.

There is no necessary execution sequence between step 501 and step 502. For example, step 501 may be performed before or after step 502, or step 501 and step 502 may be performed simultaneously, or actions in step 501 and step 502 may be performed alternately.

After receiving a bitstream of a video, a video decoding apparatus decodes the bitstream of the video to restore each video picture in an original video sequence. In this embodiment, the current picture is a current to-be-decoded picture. When the current picture is decoded, each picture block in the current picture is reconstructed sequentially, and a reconstructed pixel value of the current picture is obtained, where a current to-be-decoded picture block is referred to as the current block. The bitstream of the video includes information about the reference picture of the current block, the motion vector information, and the prediction residual signal.

When the reference picture of the current block is obtained, the information about the reference picture is extracted from the bitstream of the video, and the reference picture indicated by the information is found according to the information. For example, the information about the reference picture may be an index of the reference picture. This is not limited herein.

A position of the search start point in the reference picture is used to indicate a position of a predicted match block of the current block in the reference picture. The motion vector information is used to indicate a quantity of search steps for a match block of the current block, relative to the predicted match block, and a search direction in the reference picture. The motion vector precision includes a search step size set, and each search step size in the search step size set is less than a pixel unit. The search step size set is used to indicate information about step sizes in the quantity of search steps. Specifically, a step size of each search step in the quantity of search steps in the motion vector information is a minimum element in the search step size set. The prediction residual signal is used to indicate a residual between the current block and the match block.

There are multiple methods for obtaining the search start point in the reference picture. For example, the bitstream of the video further includes information about the search start point. The video decoding apparatus extracts the information about the search start point from the bitstream of the video, and finds, according to the information, the search start point indicated by the information. Alternatively, an encoder and a decoder use a same method to compute the search start point in the reference picture for the current picture. In this case, there is no information about the search start point in the bitstream of the video received by the video decoding apparatus, and the video decoding apparatus obtains the search start point through computation by itself.

There are multiple methods for obtaining the motion vector precision. For example, the bitstream of the video further includes information about the motion vector precision. After receiving the bitstream of the video, the video decoding apparatus reads the information about the motion vector precision from the bitstream of the video, and determines the motion vector precision according to the information. The information about the motion vector precision may be an index of the motion vector precision, or a value of the motion vector precision. This is not limited herein. Alternatively, the encoder and the decoder use a same method to compute the motion vector precision of the current picture. In this case, there is no information about the motion vector precision in the bitstream of the video received by the video decoding apparatus, and the video decoding apparatus obtains the motion vector precision through computation by itself.

In this embodiment, the motion vector precision may be unitary motion vector precision, or preferably, may be step-wise motion vector precisions. When the motion vector precision is a unitary motion vector precision value, the search step size set is $\{½^x\}$, where x is a positive integer. That is, the search step size set includes only one search step size, and the search step size is $½^x$ pixel unit. For example, the search step size may be ½ pixel unit, ¼ pixel unit, ⅛ pixel unit, or 1/16 pixel unit. This is not limited herein.

When the motion vector precision is step-wise motion vector precisions, the search step size set is {y|y=½$^x$, where x is a positive integer}. That is, the search step size set includes at least one search step size, and a value of each search step size is equal to ½$^x$. That is, each search step size is ½$^x$ pixel unit, and values of x corresponding to different search step sizes are different. The motion vector precision further includes a threshold set, and the threshold set includes at least one threshold. Each threshold is used to indicate a search region in the reference picture. Each search step size in the search step size set in the motion vector precision corresponds to each threshold in the threshold set on a one-to-one basis. In the search region indicated by each threshold, a search step size corresponding to the threshold is used as a search step size.

503. Search for a match block of the current block according to information about the reference picture, information about the search start point, the motion vector information, and information about the motion vector precision of the current picture.

Because the motion vector information includes the quantity of search steps for the match block relative to the search start point, and the search direction, but the information about the motion vector precision of the current picture includes the search step size corresponding to the quantity of search steps, the match block of the current block may be found according to the motion vector information and the information about the motion vector precision of the current picture by using the search start point in the reference picture as a start point.

When the match block of the current block is found according to the motion vector information and the information about the motion vector precision of the current picture, corresponding algorithms are different, depending on when the motion vector precision is unitary motion vector precision or step-wise motion vector precisions. For example, when the motion vector precision is unitary motion vector precision, a motion vector of the match block is computed by using the following formula, where MVR is motion vector precision:

$$MV' = \begin{cases} MVP + 4 \times MVD, & MVR = 1/2 \\ MVP + 2 \times MVD, & MVR = 1/4 \\ MVP + MVD, & MVR = 1/8 \end{cases}$$

504. Obtain a reconstructed pixel value of the current block according to the match block and the prediction residual signal.

The prediction residual signal is a residual between a pixel value of each pixel on the match block and a pixel value of each pixel on the current block. Therefore, the pixel value of each pixel on the match block is added to a pixel value of a corresponding pixel in the prediction residual signal, and the reconstructed pixel value of the current block can be obtained.

The inventors of this application find that, for a video sequence with different content features, adaptively selecting motion vector precision of a video picture in the video sequence is more helpful for coding of the video picture. For example, for a video picture with a slow motion and few texture details, when a reference picture is searched for a match block, use of a low-precision motion vector, in comparison with use of a high-precision motion vector, may reduce bits required for coding of the motion vector, reduce a motion search step in a motion estimation process and computational load in interpolation of the reference picture, and reduce a coding and decoding time. For a video picture with an intensive motion and a complex texture, when a reference picture is searched for a match block, use of a low-precision motion vector, in comparison with use of a high-precision motion vector, may obtain a match block more similar to a current block, reduce a prediction residual, and improve coding efficiency. Based on the findings, in this embodiment of the present disclosure, an encoder obtains a content feature of a current picture according to the current picture and a coded picture set, and further determines motion vector precision that complies with the content feature of the current picture. Therefore, when a decoder searches for a match block, the decoder first obtains the motion vector precision and motion vector information of the current picture, and searches for the match block according to the motion vector precision and the motion vector information.

Optionally, in some possible implementations of the present disclosure, the motion vector precision of the current picture is step-wise motion vector precisions, that is, the search step size set is {y|y=½$^x$, where x is a positive integer}; and the motion vector precision further includes a threshold set, and the threshold set includes at least one threshold. Before step 503, the method further includes: determining, according to each threshold in the threshold set and the search start point, a search region corresponding to the threshold. The search start point is located in the search region, and a search step size in the search region corresponding to each threshold corresponds to each element in the search step size set on a one-to-one basis. When the threshold set includes at least two elements, with respect to adjacent step sizes y1 and y2 sorted in the search step size set, y1<y2, and a search region corresponding to a threshold corresponding to y2 surrounds a search region corresponding to a threshold corresponding to y1 and is connected to the search region corresponding to the threshold corresponding to y1.

There are multiple possibilities of values for the search step size set. For example, the search step size set is {¼, ⅛}, or is {½, ¼, ⅛}, or is {¼, ⅛, 1/16}, or is {½, ¼, ⅛, 1/16}. This is not limited herein.

The search region corresponding to the threshold may be in multiple shapes. An example in which a shape of the search region is a square is hereinafter used for description.

The search step size set is {y1, y2}, and the threshold set is {m1, m2}, where y1<y2, m1<m2, y1 corresponds to m1, y2 corresponds to m2, m1 is a positive integer multiple of 2 or 0, and m2 is a positive integer multiple of 4. The determining, according to each threshold in the threshold set and the search start point, a search region corresponding to the threshold includes:

when the search start point is located on an integer pixel or a ½ pixel, performing the following steps:

using a region in a first square as a search region corresponding to m1, where the first square is a square that uses the search start point as a center and uses 2m1*minimum pixel unit as a side length; and using a region between the first square and a second square as a search region corresponding to m2, where the second square is a square that uses the search start point as a center and uses 2m2*minimum pixel unit as a side length; or when the search start point is neither located on an integer pixel nor located on a ½ pixel, performing the following steps:

using a region in a third square as a search region corresponding to m1, where the third square is a square that uses a y2 pixel closest to the search start point as a center and uses 2m1*minimum pixel unit as a side length; and using a region between the third square and a fourth square as a search region corresponding to m2, where the fourth square is a square that uses a y3 pixel closest to the search start point as a center and uses 2m2*minimum pixel unit as a side length, and when a maximum element in the search step size set is $½^i$, $y3=½^{i-1}$; where the minimum pixel unit is a minimum element in the search step size set.

For ease of understanding, an example in which y1=⅛, y2=¼, m1=2, and m2=4 is hereinafter used for description.

Refer to FIG. 2 and FIG. 3. As shown in FIG. 2, a circular block is a ½ pixel, a square block is a ¼ pixel, and a triangular block is a ⅛ pixel. The search start point (marked with a shadow block in the figure) is located on a ½ pixel. In this case:

the first square (marked with P1 in the figure) is a square that uses the search start point as a center and uses 2*2*minimum pixel unit (namely, ⅛ pixel unit)=½ pixel unit as a side length; and the second square (marked with P2 in the figure) is a square that uses the search start point as a center and uses 2*4*minimum pixel unit (namely, ⅛ pixel unit)=1 pixel unit as a side length.

The search region corresponding to m1 is the first square, and a search step size used when a search is performed in the search region is ⅛ pixel unit. The search region corresponding to m2 is a region between the first square and the second square, and a search step size used when a search is performed in the search region is ¼ pixel unit.

As shown in FIG. 3, a circular block is a ½ pixel, a square block is a ¼ pixel, and a triangular block is a ⅛ pixel. The search start point (marked with a shadow block in the figure) is located on a ⅛ pixel. In this case:

the third square (marked with P3 in the figure) is a square that uses a ¼ pixel closest to the search start point as a center and uses 2*2*minimum pixel unit (namely, ⅛ pixel unit)=½ pixel unit as a side length; and the fourth square (marked with P4 in the figure) is a square that uses a ½ pixel closest to the search start point as a center and uses 2*4*minimum pixel unit (namely, ⅛ pixel unit)=1 pixel unit as a side length.

The search region corresponding to m1 is the third square, and a search step size used when a search is performed in the search region is ⅛ pixel unit. The search region corresponding to m2 is a region between the third square and the fourth square, and a search step size used when a search is performed in the search region is ¼ pixel unit.

At least one y2 pixel and at least one y3 pixel are closest to the search start point, and any y2 pixel and any y3 pixel may be selected as the center of the third square P3 and the center of the fourth square P4 respectively. Preferably, a y2 pixel and a y3 pixel that are located on a same side of the search start point are selected as the center of the third square P3 and the center of the fourth square P4 respectively, so as to avoid that the third square P3 cannot be completely located in the fourth square P4.

In the foregoing embodiment, an example in which the shape of the search region is a square is used for description. In an actual application, the shape of the search region may also be a circle, a regular hexagon, or another shape. This is not limited herein.

In this embodiment, because the motion vector precision is step-wise motion vector precisions, different search step sizes are used for different search regions. However, the video decoding apparatus cannot determine whether the encoder uses the search step size in the search region or merely uses a default maximum search step size, namely, a pixel unit, when the encoder searches for the match block according to the search start point in the reference picture of the current block when the current block is encoded. That is, the video decoding apparatus needs to obtain the search step size corresponding to each search step in the quantity of search steps in the received motion vector information.

Therefore, the video decoding apparatus needs to first determine whether a search is performed in the search region that is obtained by division according to the motion vector precision when the encoder searches for the match block. In this embodiment, the determining is performed by determining a reference search region and a temporary point. The following provides detailed descriptions.

Further, optionally, in some possible implementations of the present disclosure, the searching for the match block of the current block according to information about the reference picture, the information about search start point, the motion vector information, and information about the motion vector precision of the current picture in step 503 includes:

S1. Determine a reference search region.

A center Ce of the reference search region is located between a center Ce1 of the search region corresponding to m1 and a center Ce2 of the search region corresponding to m2, and Ce=$f_1$(Ce1,Ce2). Specifically, for example, if coordinates of the center Ce are ($Ce_x$,$Ce_y$), and coordinates of the center Ce1 are ($Ce1_x$,$Ce1_y$), and coordinates of the center Ce2 are ($Ce2_x$,$Ce2_y$), $Ce_x=(Ce1_x+Ce2_x)/2$, and $Ce_y=(Ce1_y+Ce2_y)/2$.

A side length L of the reference search region is greater than a side length L1 of the search region corresponding to m1 and less than a side length L2 of the search region corresponding to m2, L=$f_2$(L1,L2), and $f_1$(x1,x2)=$f_2$(x1,x2). That is, a computation rule used for computing the center Ce according to the center Ce1 and the center Ce2 is the same as a computation rule used for computing the side length L according to the side length L1 and the side length L2. Specifically, for example, when $Ce_x=(Ce1_x+Ce2_x)/2$, and $Ce_y=(Ce1_y+Ce2_y)/2$, L=(L1+L2)/2.

S2. Determine a temporary point.

A motion vector of the temporary point relative to the search start point is the quantity of search steps and the search direction in the motion vector information, and a search step size is the minimum element in the search step size set.

S3. When the temporary point is located outside the reference search region, determine a first quantity of steps, a second quantity of steps, and a third quantity of steps.

The quantity of search steps is a sum of the first quantity of steps, the second quantity of steps, and the third quantity of steps. A search step size actually corresponding to the first quantity of steps is y1. A search step size actually corresponding to the second quantity of steps is y2. A search step size actually corresponding to the third quantity of steps is y3. When the maximum element in the search step size set is $½^i$, $y3=½^{i-1}$.

S4. When the temporary point is located in the reference search region, perform the following step:

S5. When the temporary point is located outside the search region corresponding to m1, determine a third quantity of steps and a fourth quantity of steps.

The quantity of search steps is a sum of the third quantity of steps and the fourth quantity of steps. A search step size actually corresponding to the third quantity of steps is y1. A search step size actually corresponding to the fourth quantity of steps is y2.

S6. When the temporary point is located in the search region corresponding to m1, determine that a search step size actually corresponding to the quantity of search steps is y1.

After the search step size actually corresponding to the quantity of search steps in the motion vector information is determined, a position of the match block may be determined according to the quantity of search steps, the search step size, and the search direction.

For better understanding and implementing the foregoing solution of the embodiment of the present disclosure, the following uses some specific application scenarios as examples for description.

Figure 6:
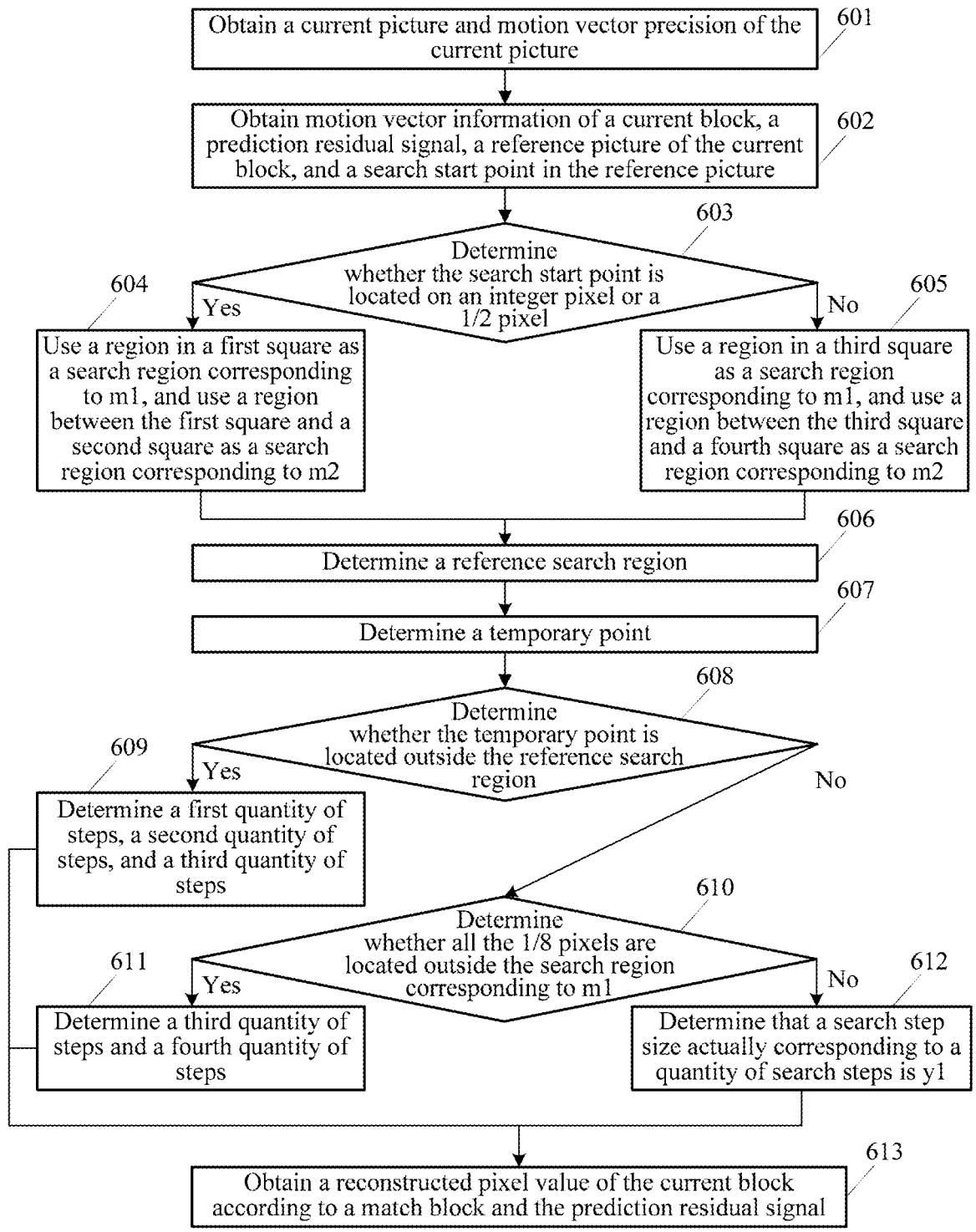
FIG. 6 is a schematic flowchart of another embodiment of a video decoding method according to the present disclosure.

Referring to FIG. 6, FIG. 6 is a schematic flowchart of another embodiment of a video decoding method according to the present disclosure. In this embodiment, the video decoding method includes the following steps.

601. Obtain a current picture and motion vector precision of the current picture.

The motion vector precision specifically includes a search step size set $\{1/8, 1/4\}$ and a threshold set $\{m1, m2\}$.

602. Obtain motion vector information of a current block, a prediction residual signal, a reference picture of the current block, and a search start point in the reference picture.

603. Determine whether the search start point is located on an integer pixel or a ½ pixel.

If yes, step 604 is performed.

If no, step 605 is performed.

604. Use a region in a first square as a search region corresponding to m1, and use a region between the first square and a second square as a search region corresponding to m2.

The first square is a square that uses the search start point as a center and uses 2m1*minimum pixel unit as a side length. The second square is a square that uses the search start point as a center and uses 2m2*minimum pixel unit as a side length. The minimum pixel unit is a minimum element in the search step size set.

For ease of description, it is assumed that a motion vector Ce1 $(Ce1_x, Ce1_y)$ points to the center of the search region corresponding to m1, and that a motion vector Ce2 $(Ce2_x, Ce2_y)$ points to the center of the search region corresponding to m2.

605. Use a region in a third square as a search region corresponding to m1, and use a region between the third square and a fourth square as a search region corresponding to m2.

The third square is a square that uses a ¼ pixel closest to the search start point as a center and uses 2m1*minimum pixel unit as a side length. The fourth square is a square that uses a ½ pixel closest to the search start point as a center and uses 2m2*minimum pixel unit as a side length. The minimum pixel unit is a minimum element in the search step size set.

For ease of description, it is assumed that a motion vector Ce1$(Ce1_x, Ce1_y)$ points to the center of the third square, that is, the motion vector Ce1 points to the center of the search region corresponding to m1, and that a motion vector Ce2 $(Ce2_x, Ce2_y)$ points to the center of the fourth square, that is, the motion vector Ce2 points to the center of the search region corresponding to m2.

Specifically, Ce1 $(Ce1_x, Ce1_y)$ may be computed by using a formula (1), and Ce2 $(Ce2_x, Ce2_y)$ may be computed by using a formula (2):

$$Ce1_x = \lfloor \lfloor MVP_x/2 \rfloor \times 2 \rfloor, Ce1_y = \lfloor \lfloor MVP_y/2 \rfloor \times 2 \rfloor \quad (1) \text{ and}$$

$$Ce2_x = \lfloor \lfloor (MVP_x+1)/2 \rfloor \times 2 \rfloor, Ce2_y = \lfloor \lfloor (MVP_y+1)/2 \rfloor \times 2 \rfloor \quad (2)$$

where $MVP_x$ is a component of an MVP of the current block in a horizontal direction, and $MVP_y$ is a component of the MVP of the current block in a vertical direction.

606. Determine a reference search region.

A center Ce of the reference search region is located between a center Ce1 of the search region corresponding to m1 and a center Ce2 of the search region corresponding to m2, and Ce=$f_1$(Ce1,Ce2). Specifically, for example, if coordinates of the center Ce are $(Ce_x, Ce_y)$, and coordinates of the center Ce1 are $(Ce1_x, Ce1_y)$, and coordinates of the center Ce2 are $(Ce2_x, Ce2_y)$, $Ce_x = (Ce1_x + Ce2_x)/2$, and $Ce_y = (Ce1_y + Ce2_y)/2$.

A side length L of the reference search region is greater than a side length L1 of the search region corresponding to m1 and less than a side length L2 of the search region corresponding to m2, L=$f_2$(L1,L2), and $f_1(x1,x2)=f_2(x1,x2)$. That is, a computation rule used for computing the center Ce according to the center Ce1 and the center Ce2 is the same as a computation rule used for computing the side length L according to the side length L1 and the side length L2. Specifically, for example, when $Ce_x=(Ce1_x+Ce2_x)/2$, and $Ce_y=(Ce1_y+Ce2_y)/2$, L=(L1+L2)/2.

607. Determine a temporary point.

A motion vector of the temporary point relative to the search start point is a quantity of search steps and a search direction in the motion vector information, and a search step size is the minimum element in the search step size set.

Specifically, it is assumed that coordinates of the temporary point are MVt $(MVt_x, MVt_y)$. In this case, $MVT_x = MVD_x + MVP_x$, and $MVT_y = MVD_y + MVP_y$.

608. Determine whether the temporary point is located outside the reference search region, and if yes, perform step 609, or if no, perform step 610.

Specifically, whether the temporary point is located outside the reference search region is computed by using a formula (3):

$$|MVt_x - Ce_x| > L \text{ or } |MVt_y - Ce_y| > L \quad (3)$$

When the formula (3) is satisfied, step 609 is performed. If the formula (3) is not satisfied, step 610 is performed.

609. Determine a first quantity of steps, a second quantity of steps, and a third quantity of steps.

The quantity of search steps is a sum of the first quantity of steps, the second quantity of steps, and the third quantity of steps. A search step size actually corresponding to the first quantity of steps is y1 (namely, ⅛). A search step size actually corresponding to the second quantity of steps is y2 (namely, ¼). A search step size actually corresponding to the third quantity of steps is y3 (namely, ½). When a maximum element in the search step size set is $½^i$, $y3 = ½^{i-1}$.

When the first quantity of steps, the second quantity of steps, and the third quantity of steps respectively corresponding to the search step sizes y1, y2, and y3 in the quantity of search steps in the motion vector information are determined, a motion vector MV of a match block may be computed according to the motion vector MVt of the temporary point. Specifically, computation may be performed by using the following step and formula. In the following formula, $MV_x$ is a component of the MV in the horizontal direction, and $MV_y$ is a component of the MV in the vertical direction.

When $|MVt_x-Ce_x|>L$, whether a position to which MVt points is on the left or right of Ce is determined.

If the position is on the left, $MV_x$ is computed by using the following formula:

$$MV_x=MVt_x\times4-(Ce_x-THe)\times4-((Cq_x-THq)-(Ce_x-THe))\times2+(Cq_x-THq), MV_y=MVD_y\times4+Cq_y.$$

If the position is on the right, $MV_x$ is computed by using the following formula:

$$MV_x=MVt_x\times4-(Ce_x-THe)\times4-((Cq_x-THq)-(Ce_x-THe))\times2+(Cq_x-THq), MV_y=MVD_y\times4+Cq_y.$$

Otherwise, when $|MVt_y-Ce_y|>L$, whether a position to which MVt points is above or below Ce is determined.

If the position is above Ce, $MV_y$ is computed by using the following formula:

$$MV_y=MVt_y\times4-(Ce_y-THe)\times4-((Cq_y-THq)-(Ce_y-THe))\times2+(Cq_y-THq), MV_x=MVD_x\times4+Cq_x.$$

If the position is below Ce, $MV_y$ is computed by using the following formula:

$$MV_y=MVt_y\times4-(Ce_y-THe)\times4-((Cq_y-THq)-(Ce_y-THe))\times2+(Cq_y-THq), MV_x=MVD_x\times4+Cq_y.$$

610. Determine whether the temporary point is located outside the search region corresponding to m1, and if yes, perform step 611, or if no, perform step 612.

Specifically, whether the temporary point is located outside the search region corresponding to m1 is computed by using a formula (4):

$$|MVt_x-Ce_x|>m1 \text{ or } |MVt_y-Ce_y|>m1 \quad (4)$$

When the formula (4) is satisfied, step 611 is performed. If the formula (4) is not satisfied, step 612 is performed.

611. Determine a third quantity of steps and a fourth quantity of steps.

The quantity of search steps is a sum of the third quantity of steps and the fourth quantity of steps. A search step size actually corresponding to the third quantity of steps is y1. A search step size actually corresponding to the fourth quantity of steps is y2.

When the third quantity of steps and the fourth quantity of steps respectively corresponding to the search step sizes y1 and y2 in the quantity of search steps in the motion vector information are determined, a motion vector MV of a match block may be computed according to the motion vector MVt of the temporary point. Specifically, computation may be performed by using the following step and formula. In the following formula, $MV_x$ is a component of the MV in the horizontal direction, and $MV_y$ is a component of the MV in the vertical direction.

When $|MVt_x-Ce_x|>m1$, whether a position to which MVt points is on the left or right of Ce is determined.

If the position is on the left, $MV_x$ is computed by using the following formula:

$$MV_x=MVt_x\times2-(Ce_x-THe)\times2+((Cq_x-THe), MV_y=MVD_y\times2+Ce_y.$$

If the position is on the right, $MV_y$ is computed by using the following formula:

$$MV_x=MVt_x\times2-(Ce_x-THe)\times2+((Cq_x-THe), MV_y=MVD_y\times2+Ce_y.$$

Otherwise, when $|MVt_y-Ce_y|>m1$, whether a position to which MVt points is on the above or below of Ce is determined.

If the position is above Ce, $MV_y$ is computed by using the following formula:

$$MV_y=MVt_y\times2-(Ce_y-THe)\times2+((Cq_y-THe), MV_x=MVD_x\times2+Ce_x.$$

If the position is below Ce, $MV_y$ is computed by using the following formula:

$$MV_y=MVt_y\times2-(Ce_y+THe)\times2+((Cq_y-THe), MV_x=MVD_x\times2+Ce_x.$$

612. Determine that a search step size actually corresponding to a quantity of search steps is y1.

In this case, the motion vector MV of the match block may be computed directly according to the following formula:

$$MV_x=MVD_x+MVP_x, MV_y=MVD_y+MVP_y.$$

613. Obtain a reconstructed pixel value of the current block according to ta match block and the prediction residual signal.

After the motion vector of the match block is obtained, a position of the match block may be determined from the reference frame according to the motion vector, and a pixel value of each pixel on the match block is obtained. Further, the pixel value of each pixel on the match block is added to a pixel value of a corresponding pixel in the prediction residual signal, and the reconstructed pixel value of the current block can be obtained.

In this embodiment of the present disclosure, the motion vector precision of the current picture needs to be obtained. In an actual application, there are multiple methods for obtaining the motion vector precision of the current picture. For example, a video decoding apparatus may compute the motion vector precision of the current picture by itself by using a preset method. A video coding apparatus may also compute the motion vector precision of the current picture by using the preset method, so as to ensure that the motion vector precision used by an encoder is consistent with that used by a decoder.

Optionally, in some possible implementations of the present disclosure, the obtaining motion vector precision of the current picture includes: obtaining a quantization parameter of the current picture; obtaining a width value in a resolution of the current picture; and determining the motion vector precision of the current picture according to the width value and the quantization parameter of the current picture and according to a preset policy. The preset policy may be a table search method, or is a threshold method, or is computing a decision factor by using a formula, and selecting the motion vector precision of the current picture according to a result of comparison between the decision factor and a preset value, or is another policy. This is not limited herein.

For example, the preset policy is a table search method. The foregoing Table 1 is prestored in the video coding apparatus. A first row in Table 1 indicates a range of values of the quantization parameter of the current picture, and a first column indicates a range of width values in the resolution of the current picture. After the width value in the resolution of the current picture and the quantization parameter of the current picture are obtained, Table 1 is searched for the motion vector precision of the current picture.

Optionally, in some possible implementations of the present disclosure, due to motion continuity, the decoder may obtain a content feature of the current picture according to a coded picture set and the current picture, and further determine the motion vector precision of the current picture according to the content feature. The coded picture set includes at least one coded picture. Each coded picture in the coded picture set may be a coded picture adjacent to the current picture in a video sequence, or may be a coded picture that is separated from the current picture by at least one picture. This is not limited herein. The obtaining motion vector precision of the current picture includes:

S10. Obtain a quantization parameter of the current picture.

S11. Determine a decoded picture set, and obtain decoding information of each decoded picture in the decoded picture set.

In this embodiment, the coded picture set includes at least one coded picture. Preferably, there is only one element in the coded picture set, and the element is a coded picture temporally adjacent to the current picture. Because a content feature of the coded picture temporally adjacent to the current picture is similar to that of the current picture, using the coded picture to obtain the motion vector precision of the current picture can make the motion vector precision of the current picture more compliant with the content feature of the current picture. In addition, because the coded picture set includes only one element, computational load can be reduced.

The decoding information includes a motion vector difference of each decoding block in the decoded picture and a quantity of pixels included in each decoding block in the decoded picture, and the motion vector difference of the decoding block is used to indicate the motion vector information when the decoding block is the current block. That is, when the decoding block is the current block, the motion vector difference of the decoding block is a motion vector of the match block of the decoding block, relative to the search start point in the reference picture of the decoding block.

S12. Compute motion intensity of each decoding picture in the decoded picture set.

The motion intensity of the decoding picture is an average value of first values of all decoding blocks in the decoding picture, and the first value of the decoding block is a product of a sum of an absolute value of a horizontal component of the motion vector difference of the decoding block and an absolute value of a vertical component of the motion vector difference of the decoding block and the quantity of pixels included in the decoding block.

Specifically, M is used to indicate the motion intensity of the decoded picture, $mvd_x$ is used to indicate the horizontal component of the motion vector difference of the decoding block, $mvd_y$ is used to indicate the vertical component of the motion vector difference of the decoding block, and pusize is used to indicate the quantity of pixels included in the decoding block. In this case, $$M = \frac{1}{n}\sum (|mvd_x| + |mvd_y|) \times pusize.$$

S13. Use a weighted average value of motion intensity of all decoding pictures in the decoded picture set as motion intensity of the decoded picture set.

Specifically, weighted values of motion intensity of all the decoded pictures may be the same or may be different. This is not limited herein.

S14. Obtain the motion vector precision of the current picture according to the motion intensity of the decoded picture set and the quantization parameter of the current picture and according to a preset policy.

The preset policy may be a table search method, or is a threshold method, or is computing a decision factor by using a formula, and selecting the motion vector precision of the current picture according to a result of comparison between the decision factor and a preset value, or is another policy. This is not limited herein.

For example, the preset policy is a table search method. The foregoing Table 2 is prestored in the video decoding apparatus. A first row in Table 2 indicates a range of values of the quantization parameter of the current picture, and a first column indicates a range of values of motion intensity of the decoded picture set. After the motion intensity of the decoded picture set and the quantization parameter of the current picture are obtained, Table 2 is searched for the motion vector precision of the current picture.

Further, optionally, in some possible implementations of the present disclosure, the obtaining motion vector precision of the current picture according to the current picture and the coded picture set includes:

S15. Obtain texture complexity of the decoded picture set.

The obtaining texture complexity of the decoded picture set includes:

obtaining pixel values of all pixels in each decoded picture in the decoded picture set;

computing an average value of quadratic sums of differences between pixel values of pixels and pixel values of adjacent pixels thereof in the decoded picture, and using the average value as texture complexity of the decoded picture; and using a weighted average value of texture complexity of all decoded pictures in the decoded picture set as the texture complexity of the decoded picture set.

Specifically, $A_i$ is used to indicate texture complexity of an $i^{th}$ decoded picture in the decoded picture set, $s_{xy}$ is used to indicate a pixel value of a pixel in the current picture, where x and y are coordinates of the pixel, and A is used to indicate the texture complexity of the coded picture set. In this case, $$A = \frac{1}{2n}\sum[(s_{x,y} - s_{x+1,y})^2 + (s_{x,y} - s_{x,y+1})^2], A = \frac{L}{n}\sum A_i$$

The step S14 is specifically determining the motion vector precision of the current picture according to the motion intensity of the coded picture set, the quantization parameter of the current picture, and the texture complexity of the decoded picture set, and according to the preset policy.

There are multiple preset policies. The following describes one of the preset policies by using an example:

S21. Compute a decision factor F according to the texture complexity A of the decoded picture set and the motion intensity M of the decoded picture set.

Specifically, F=12M15A. Certainly, parameters M and A may also be other parameters. This is not limited herein.

S22. Obtain thresholds Th0 and Th1 according to the quantization parameter QP of the current picture.

The thresholds Th0 and Th1 may be computed according to the following formula:

$Th_0 = a_0 QP^2 + b_0 QP + c_0$ $Th_1 = a_1 QP^2 + b_1 QP + c_1$

Specifically, coefficients $a_0$, $a_1$, $b_0$, $b_1$, $c_0$, and $c_1$ in the formula are −0.02, 0.57, 16, −0.03, 0.6, and 38 respectively.

Certainly, the coefficients in the formula may also be other values. This is not limited herein.

S23. Compare F with the thresholds Th0 and Th1 to obtain an $MVR_1$.

Specifically, the $MVR_1$ may be obtained according to the following formula:

$$MVR_1 = \begin{cases} 1/8, & F < Th_0 \\ 1/4, & Th_0 \leq F < Th_1 \\ 1/2, & F \geq Th_1 \end{cases}.$$

S24. Collect statistics about distribution of absolute values of motion vector differences MVDs in the decoded picture set.

Statistics about distribution probabilities of absolute values of horizontal components mvdx of the motion vector differences and absolute values of vertical components mvdy of the motion vector differences in the following five intervals are collected separately to obtain:

$$\begin{cases} P_0, & |mvd| = 0 \\ P_{1,2}, & 1 \leq |mvd| \leq 2 \\ P_{3,4}, & 3 \leq |mvd| \leq 4 \\ P_{5,8}, & 5 \leq |mvd| \leq 8 \\ P_8, & |mvd| > 8 \end{cases}.$$

S25. Obtain the motion vector precision MVR of the current picture by using the following formula:

$$MVR = \begin{cases} (0, 4), & MVR_1 = 1/2 \text{ and } P_0 + P_{1,2} + P_{3,4} \geq 60\,\% \\ (0, 8), & MVR_1 = 1/2 \text{ and } P_0 + P_{1,2} + P_{3,4} < 60\% \text{ and} \\ & P_0 + P_{1,2} + P_{3,4} + P_{5,8} \geq 70\,\% \\ 1/2, & MVR_1 = 1/2 \text{ and } P_0 + P_{1,2} + P_{3,4} < 60\,\% \text{ and} \\ & P_0 + P_{1,2} + P_{3,4} + P_{5,8} < 70\,\% \\ (4, 8), & MVR_1 = 1/4 \text{ and } P_0 + P_{1,2} + P_{3,4} \geq 85\,\% \\ (2, 4), & MVR_1 = 1/4 \text{ and } P_0 + P_{1,2} \geq 50\,\% \\ 1/4, & MVR_1 = 1/4 \text{ and } P_0 + P_{1,2} + P_{3,4} < 85\,\% \text{ and} \\ & P_0 + P_{1,2} < 50\,\% \\ (4, 8), & MVR_1 = 1/8 \text{ and } P_0 + P_{1,2} + P_{3,4} + P_{5,8} \geq 15\,\% \\ 1/8, & MVR_1 = 1/8 \text{ and } P_0 + P_{1,2} + P_{3,4} + P_{5,8} < 15\,\% \end{cases}.$$

The foregoing describes the video coding method and the video decoding method according to the present disclosure. For better understanding and implementing the foregoing technical solutions of the embodiments of the present disclosure, the following further provides related apparatuses for implementing the foregoing solutions.

Figure 7:
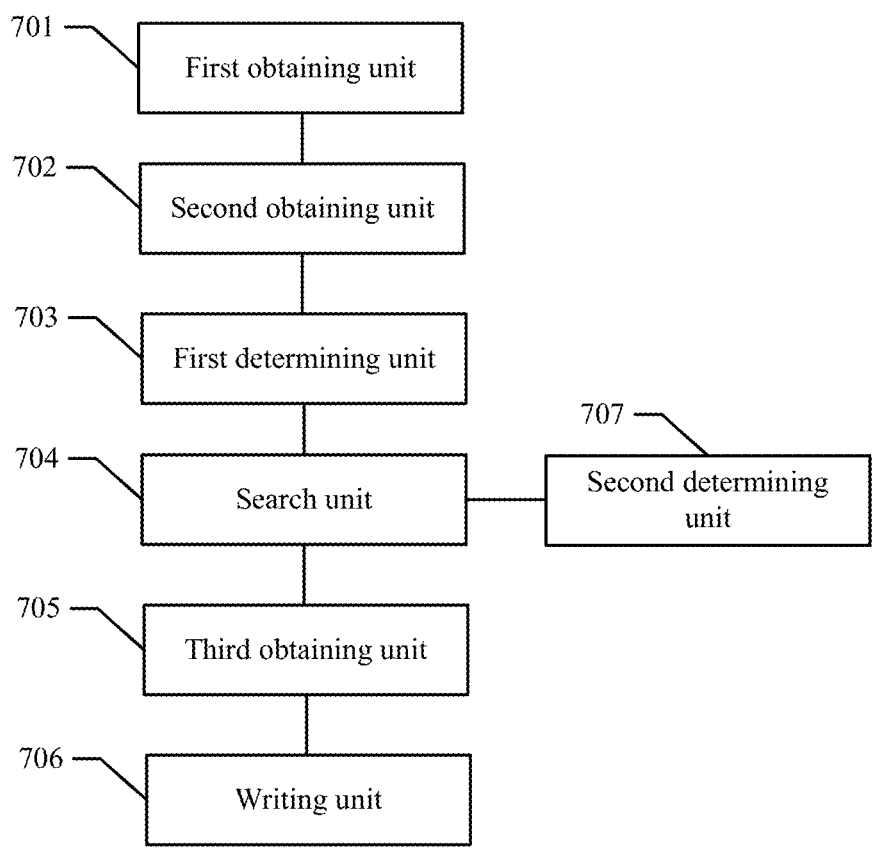
FIG. 7 is a schematic structural diagram of a video coding apparatus according to an embodiment of the present disclosure.

Referring to FIG. 7, an embodiment of the present disclosure provides a video coding apparatus. The apparatus may include:

a first obtaining unit 701, configured to obtain a current picture, and obtain motion vector precision of the current picture according to the current picture, where the motion vector precision includes a search step size set, and each search step size in the search step size set is less than a pixel unit;

a second obtaining unit 702, configured to obtain a current block and a reference picture of the current block, where the current block is a current to-be-coded picture block in the current picture;

a first determining unit 703, configured to determine a search start point in the reference picture, and search, from the search start point, for a target integer pixel by using a pixel unit as a search step size;

a search unit 704, configured to search, from the target integer pixel, for a match block of the current block according to the motion vector precision;

a third obtaining unit 705, configured to obtain motion vector information and a prediction residual signal, where the motion vector information includes a quantity of search steps for the match block relative to the search start point, and a search direction, and the prediction residual signal is used to indicate a residual between the current block and the match block; and a writing unit 706, configured to write information about the reference picture, the motion vector information, and the prediction residual signal into a bitstream, where the information about the reference picture is used to indicate the reference picture.

In some possible implementations of the present disclosure, the writing unit 706 is further configured to write information about the motion vector precision and/or information about the search start point into the bitstream, where the information about the motion vector precision is used to indicate the motion vector precision, and the information about the search start point is used to indicate the search start point.

In some possible implementations of the present disclosure, the search step size set is $\{1/2^x\}$, where x is a positive integer.

Further, in some possible implementations of the present disclosure, the search unit 704 is specifically configured to:

use the target integer pixel as a start point;

set an initial value of j to 1, and perform a preset step:

obtaining a target $1/2^j$ pixel from all $1/2^j$ pixels that are adjacent to the start point; and determine whether j is equal to x, and if j is equal to x, determine a position of the target $1/2^j$ pixel as a position of the match block; or if j is not equal to x, use the target $1/2^j$ pixel as a start point, and after adding 1 to the value of j, repeat the preset step.

In some possible implementations of the present disclosure, the search step size set is $\{y|y=1/2^x,$ where x is a positive integer$\}$; the motion vector precision further includes a threshold set, and the threshold set includes at least one threshold; and the video coding apparatus further includes:

a second determining unit 707, configured to determine, according to each threshold in the threshold set and the search start point, a search region corresponding to the threshold, where the search start point is located in the search region, and a search step size in the search region corresponding to each threshold corresponds to each element in the search step size set on a one-to-one basis; where with respect to adjacent step sizes y1 and y2 sorted in the search step size set, y1<y2, and a search region corresponding to a threshold corresponding to y2 surrounds a search region corresponding to a threshold corresponding to y1 and is connected to the search region corresponding to the threshold corresponding to y1.

Further, in some possible implementations of the present disclosure, the threshold set includes m1 and m2, where m1 is a positive integer multiple of 2 or is 0, m2 is a positive integer multiple of 4, and m1<m2; and the second determining unit 707 is specifically configured to:

when the search start point is located on an integer pixel or a ½ pixel, perform the following steps:

using a region in a first square as a search region corresponding to m1, where the first square is a square that uses the search start point as a center and uses 2m1*minimum pixel unit as a side length; and using a region between the first square and a second square as a search region corresponding to m2, where the second square is a square that uses the search start point as a center and uses 2m2*minimum pixel unit as a side length; or when the search start point is neither located on an integer pixel nor located on a ½ pixel, perform the following steps:

using a region in a third square as a search region corresponding to m1, where the third square is a square that uses a y2 pixel closest to the search start point as a center and uses 2m1*minimum pixel unit as a side length; and using a region between the third square and a fourth square as a search region corresponding to m2, where the fourth square is a square that uses a y3 pixel closest to the search start point as a center and uses 2m2*minimum pixel unit as a side length, and when a maximum element in the search step size set is $½^i$, $y3=½^{i-1}$; where the minimum pixel unit is a minimum element in the search step size set.

Still further, in some possible implementations of the present disclosure, elements in the search step size set include y1 and y2, where y1<y2; elements in the threshold set include m1 and m2, where m1<m2; and the search unit 704 is specifically configured to:

obtain a current start point according to the target integer pixel;

obtain all y2 pixels adjacent to the current start point; and when all the y2 pixels are located outside the search region corresponding to m2, determine a position of the current start point as a position of the match block; or when at least a part of all the y2 pixels are located in the search region corresponding to m2, perform the following steps:

obtaining a target y2 pixel from the y2 pixels located in the search region corresponding to m2;

obtaining all y1 pixels adjacent to the target y2 pixel; and when all the y1 pixels are located outside the search region corresponding to m1, determining a position of the target y2 pixel as a position of the match block; or when at least a part of all the y1 pixels are located in the search region corresponding to m1, obtaining a target y1 pixel from the y1 pixels located in the search region corresponding to m1, and determining a position of the target y1 pixel as a position of the match block.

In some possible implementations of the present disclosure, the search step size set is {¼, ⅛}, or is {½, ¼, ⅛}, or is {¼, ⅛, 1/16}, or is {½, ¼, ⅛, 1/16}.

In some possible implementations of the present disclosure, the first obtaining unit 701 is specifically configured to:

obtain a quantization parameter of the current picture and a coded picture set, where the coded picture set includes at least one coded picture;

obtain coding information of each coded picture in the coded picture set, where the coding information includes a motion vector difference of each coding block in the coded picture and a quantity of pixels included in each coding block in the coded picture, and the motion vector difference of the coding block is used to indicate the motion vector information when the coding block is the current block;

compute motion intensity of each coded picture in the coded picture set, where the motion intensity of the coding picture is an average value of first values of all coding blocks in the coding picture, and a first value of each coding block is a product of a sum of an absolute value of a horizontal component of the motion vector difference of the coding block and an absolute value of a vertical component of the motion vector difference of the coding block and the quantity of pixels included in the coding block;

use a weighted average value of motion intensity of all coding pictures in the coded picture set as motion intensity of the coded picture set; and determine the motion vector precision of the current picture according to the motion intensity of the coded picture set and the quantization parameter of the current picture and according to a preset policy.

Further, in some possible implementations of the present disclosure, the first obtaining unit 701 is configured to:

obtain a reference parameter, where the reference parameter includes one of texture complexity of the current picture, texture complexity of the coded picture set, or inter-picture noise of the coded picture set, or includes inter-picture noise of the coded picture set and one of texture complexity of the current picture or texture complexity of the coded picture set;

where when the reference parameter includes the texture complexity of the current picture, the first obtaining unit 701 is configured to:

obtain a pixel value of each pixel in the current picture; and compute an average value of quadratic sums of differences between pixel values of pixels and pixel values of adjacent pixels thereof in the current picture, and use the average value as the texture complexity of the current picture; or when the reference parameter includes the texture complexity of the coded picture set, the first obtaining unit 701 is configured to:

obtain a pixel value of each pixel in each coded picture in the coded picture set;

compute an average value of quadratic sums of differences between pixel values of pixels and pixel values of adjacent pixels thereof in the coded picture, and use the average value as texture complexity of the coded picture; and use a weighted average value of texture complexity of all coding pictures in the coded picture set as the texture complexity of the coded picture set; or when the reference parameter includes the inter-picture noise of the coded picture set, the first obtaining unit 701 is configured to:

obtain a prediction error of each pixel in each coded picture in the coded picture set;

compute a second average value of each coding picture, where the second average value is an average value of absolute values of prediction residual of all pixels in the coding picture; and use a weighted average value of second average values of all coded pictures in the coded picture set as the inter-picture noise of the coded picture set; and the determining the motion vector precision of the current picture according to the motion intensity of the coded picture set and the quantization parameter of the current picture and according to a preset policy specifically includes:

determining the motion vector precision of the current picture according to the motion intensity of the coded picture set, the quantization parameter of the current picture, and the reference parameter, and according to the preset policy.

In some possible implementations of the present disclosure, the first obtaining unit is specifically configured to:
obtain a quantization parameter of the current picture;
obtain a width value in a resolution of the current picture; and
determine the motion vector precision of the current picture according to the width value and the quantization parameter of the current picture and according to a preset policy.

The foregoing describes the video coding apparatus according to the present disclosure. The following describes a video decoding apparatus according to the present disclosure.

Figure 8:
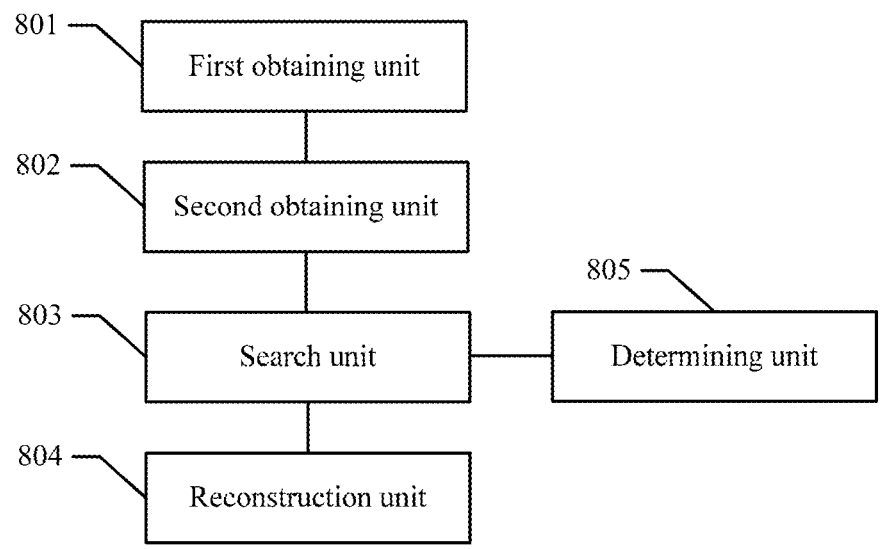
FIG. 8 is a schematic structural diagram of a video decoding apparatus according to an embodiment of the present disclosure.

Referring to FIG. 8, an embodiment of the present disclosure provides a video decoding apparatus. The apparatus may include:
a first obtaining unit 801, configured to obtain a current picture and motion vector precision of the current picture, where the motion vector precision includes a search step size set, and each search step size in the search step size set is less than a pixel unit;
a second obtaining unit 802, configured to obtain motion vector information of a current block, a prediction residual signal, a reference picture of the current block, and a search start point in the reference picture, where the current block is a current to-be-decoded picture block in the current picture, the motion vector information includes a quantity of search steps for a match block of the current block, relative to the search start point, and a search direction in the reference picture, and the prediction residual signal is used to indicate a residual between the current block and the match block;
a search unit 803, configured to search for the match block of the current block according to the reference picture, the search start point, the motion vector information, and the motion vector precision of the current picture; and
a reconstruction unit 804, configured to obtain a reconstructed pixel value of the current block according to the match block and the prediction residual signal.

In some possible implementations of the present disclosure, the search step size set is $\{½^x\}$, where x is a positive integer.

In some possible implementations of the present disclosure, the search step size set is $\{y|y=½^x, \text{ where } x \in N+\}$; the motion vector precision further includes a threshold set, and the threshold set includes at least one threshold; and
the video decoding apparatus further includes:
a determining unit 805, configured to determine, according to each threshold in the threshold set and the search start point, a search region corresponding to the threshold, where the search start point is located in the search region, and search step sizes in search regions corresponding to different thresholds are different elements in the search step size set; where
elements in the threshold set correspond to different elements in the search step size set; and with respect to adjacent y1 and y2 sorted in the search step size set, y1<y2, and a search region corresponding to a threshold corresponding to y2 surrounds a search region corresponding to a threshold corresponding to y1 and is connected to the search region corresponding to the threshold corresponding to y1.

Further, in some possible implementations of the present disclosure, the threshold set includes m1 and m2, where m1 is a positive integer multiple of 2 or is 0, m2 is a positive integer multiple of 4, and m1<m2; and
the determining unit 805 is specifically configured to:
when the search start point is located on an integer pixel or a ½ pixel, perform the following steps:
using a region in a first square as a search region corresponding to m1, where the first square is a square that uses the search start point as a center and uses 2m1*minimum pixel unit as a side length; and
using a region between the first square and a second square as a search region corresponding to m2, where the second square is a square that uses the search start point as a center and uses 2m2*minimum pixel unit as a side length; or
when the search start point is neither located on an integer pixel nor located on a ½ pixel, perform the following steps:
using a region in a third square as a search region corresponding to m1, where the third square is a square that uses a y2 pixel closest to the search start point as a center and uses 2m1*minimum pixel unit as a side length; and
using a region between the third square and a fourth square as a search region corresponding to m2, where the fourth square is a square that uses a y3 pixel closest to the search start point as a center and uses 2m2*minimum pixel unit as a side length, and when a maximum element in the search step size set is $½^i$, $y3=½^{i-1}$; where
the minimum pixel unit is a minimum element in the search step size set.

Still further, in some possible implementations of the present disclosure, the elements in the search step size set include y1 and y2, where y1<y2; the elements in the threshold set include m1 and m2; and
the search unit 803 is specifically configured to:
determine a reference search region, where a center Ce of the reference search region is located between a center Ce1 of the search region corresponding to m1 and a center Ce2 of the search region corresponding to m2, Ce=$f_1$(Ce1,Ce2), a side length L of the reference search region is greater than a side length L1 of the search region corresponding to m1 and less than a side length L2 of the search region corresponding to m2, L=$f_2$(L1,L2), and $f_1$(x1,x2)=$f_2$(x1,x2);
determine a temporary point, where a motion vector of the temporary point relative to the search start point is the quantity of search steps and the search direction in the motion vector information, and a search step size is the minimum element in the search step size set; and
when the temporary point is located outside the reference search region, determine a first quantity of steps, a second quantity of steps, and a third quantity of steps, where the quantity of search steps is a sum of the first quantity of steps, the second quantity of steps, and the third quantity of steps, a search step size actually corresponding to the first quantity of steps is y1, a search step size actually corresponding to the second quantity of steps is y2, a search step size actually corresponding to the third quantity of steps is y3, and when the maximum element in the search step size set is $½^i$, $y3=½^{i-1}$; or
when the temporary point is located in the reference search region, perform the following step:
when the temporary point is located outside the search region corresponding to m1, determining a third quantity of steps and a fourth quantity of steps, where the quantity of search steps is a sum of the third quantity of steps and the fourth quantity of steps, a search step size actually corresponding to the third quantity of steps is y1, and a search step size actually corresponding to the fourth quantity of steps is y2; or when the temporary point is located in the search region corresponding to m1, determining that a search step size actually corresponding to the quantity of search steps is y1.

In some possible implementations of the present disclosure, the search step size set is {¼, ⅛}, or is {½, ¼, ⅛}, or is {¼, ⅛, 1/16}, or is {½, ¼, ⅛, 1/16}.

In some possible implementations of the present disclosure, the first obtaining unit 801 is specifically configured to:
receive a bitstream of a video; and
read the current picture and the motion vector precision of the current picture from the bitstream of the video.

In some possible implementations of the present disclosure, the first obtaining unit 801 is specifically configured to:
receive a bitstream of a compressed video;
read the current picture from the bitstream of the compressed video;
obtain a quantization parameter of the current picture;
determine a decoded picture set, where the decoded picture set includes at least one current decoded picture;
obtain decoding information of each decoded picture in the decoded picture set, where the decoding information includes a motion vector difference of each decoding block in the decoded picture and a quantity of pixels included in each decoding block in the decoded picture, and the motion vector difference of the decoding block is used to indicate the motion vector information when the decoding block is the current block;
compute motion intensity of each decoding picture in the decoded picture set, where the motion intensity of the decoding picture is an average value of first values of all decoding blocks in the decoding picture, and the first value of the decoding block is a product of a sum of an absolute value of a horizontal component of the motion vector difference of the decoding block and an absolute value of a vertical component of the motion vector difference of the decoding block and the quantity of pixels included in the decoding block;
use a weighted average value of motion intensity of all decoding pictures in the decoded picture set as motion intensity of the decoded picture set; and
obtain the motion vector precision of the current picture according to the motion intensity of the decoded picture set and the quantization parameter of the current picture and according to a preset policy.

Further, in some possible implementations of the present disclosure, the first obtaining unit 801 is configured to:
obtain pixel values of all pixels in each decoded picture in the decoded picture set;
compute an average value of quadratic sums of differences between pixel values of pixels and pixel values of adjacent pixels thereof in the decoded picture, and use the average value as texture complexity of the decoded picture; and
use a weighted average value of texture complexity of all decoded pictures in the decoded picture set as texture complexity of the decoded picture set; and
the obtaining the motion vector precision of the current picture according to the motion intensity of the decoded picture set and the quantization parameter of the current picture and according to a preset policy specifically includes:
determining the motion vector precision of the current picture according to the motion intensity of the decoded picture set, the quantization parameter of the current picture, and the texture complexity of the decoded picture set, and according to the preset policy.

In some possible implementations of the present disclosure, the first obtaining unit 801 is specifically configured to:
obtain a quantization parameter of the current picture;
obtain a width value in a resolution of the current picture; and
determine the motion vector precision of the current picture according to the width value and the quantization parameter of the current picture and according to a preset policy.

Figure 9:
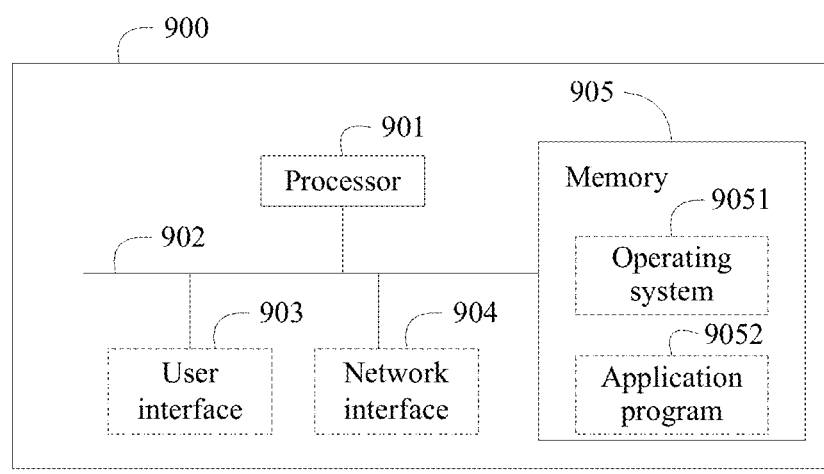
FIG. 9 is a schematic structural diagram of another video coding apparatus according to an embodiment of the present disclosure.

Referring to FIG. 9, FIG. 9 is a structural block diagram of a video coding apparatus 900 according to another embodiment of the present disclosure. The video coding apparatus 900 may include at least one processor 901, a memory 905, and at least one communications bus 902. Optionally, the video coding apparatus 900 may further include at least one network interface 904 and/or a user interface 903. The user interface 903, for example, includes a display (for example, a touchscreen, an LCD, a holographic device, a CRT, or a projector), a pointing device (for example, a mouse, a trackball, a touchpad, or a touchscreen), a camera, and/or a pickup apparatus, or the like.

The memory 905 may include a read-only memory and a random access memory, and provide an instruction and data to the processor 901. A part of the memory 905 may further include a non-volatile random access memory.

In some implementations, the memory 905 stores the following elements: executable modules or data structures, or a subset thereof, or an extended set thereof:
an operating system 9051, including various system programs, configured to implement various basic services and process hardware-based tasks; and
an application program module 9052, including various application programs, configured to implement various application services.

In this embodiment of the present disclosure, by invoking the program or instruction stored in the memory 905, the processor 901 is configured to: obtain a current picture, and obtain motion vector precision of the current picture according to the current picture, where the motion vector precision includes a search step size set, and each search step size in the search step size set is less than a pixel unit; obtain a current block and a reference picture of the current block, where the current block is a current to-be-coded picture block in the current picture; determine a search start point in the reference picture, and search, from the search start point, for a target integer pixel by using a pixel unit as a search step size; search, from the target integer pixel, for a match block of the current block according to the motion vector precision; obtain motion vector information and a prediction residual signal, where the motion vector information includes a quantity of search steps for the match block relative to the search start point, and a search direction, and the prediction residual signal is used to indicate a residual between the current block and the match block; and write information about the reference picture, the motion vector information, and the prediction residual signal into a bitstream, where the information about the reference picture is used to indicate the reference picture.

Optionally, the processor 901 is further configured to write information about the motion vector precision and/or information about the search start point into the bitstream, where the information about the motion vector precision is used to indicate the motion vector precision, and the information about the search start point is used to indicate the search start point.

Optionally, the search step size set is {½$^x$}, where x is a positive integer.

Optionally, the searching, from the target integer pixel, for a match block according to the motion vector precision includes:

using the target integer pixel as a start point;

setting an initial value of j to 1, and performing a preset step:

obtaining a target $\frac{1}{2^j}$ pixel from all $\frac{1}{2^j}$ pixels that are adjacent to the start point; and determining whether j is equal to x, and if j is equal to x, determining a position of the target $\frac{1}{2^j}$ pixel as a position of the match block; or if j is not equal to x, using the target $\frac{1}{2^j}$ pixel as a start point, and after adding 1 to the value of j, repeating the preset step.

Optionally, the search step size set is $\{y|y=\frac{1}{2^x}$, where x is a positive integer$\}$;

the motion vector precision further includes a threshold set, and the threshold set includes at least one threshold; and the processor 901 is further configured to determine, according to each threshold in the threshold set and the search start point, a search region corresponding to the threshold, where the search start point is located in the search region, and a search step size in the search region corresponding to each threshold corresponds to each element in the search step size set on a one-to-one basis; where with respect to adjacent step sizes y1 and y2 sorted in the search step size set, y1<y2, and a search region corresponding to a threshold corresponding to y2 surrounds a search region corresponding to a threshold corresponding to y1 and is connected to the search region corresponding to the threshold corresponding to y1.

Optionally, the threshold set includes m1 and m2, where m1 is a positive integer multiple of 2 or is 0, m2 is a positive integer multiple of 4, and m1<m2; and the determining, according to each threshold in the threshold set and the search start point, a search region corresponding to the threshold includes:

when the search start point is located on an integer pixel or a ½ pixel, performing the following steps:

using a region in a first square as a search region corresponding to m1, where the first square is a square that uses the search start point as a center and uses 2m1*minimum pixel unit as a side length; and using a region between the first square and a second square as a search region corresponding to m2, where the second square is a square that uses the search start point as a center and uses 2m2*minimum pixel unit as a side length; or when the search start point is neither located on an integer pixel nor located on a ½ pixel, performing the following steps:

using a region in a third square as a search region corresponding to m1, where the third square is a square that uses a y2 pixel closest to the search start point as a center and uses 2m1*minimum pixel unit as a side length; and using a region between the third square and a fourth square as a search region corresponding to m2, where the fourth square is a square that uses a y3 pixel closest to the search start point as a center and uses 2m2*minimum pixel unit as a side length, and when a maximum element in the search step size set is $\frac{1}{2^i}$, $y3=\frac{1}{2^{i-1}}$; where the minimum pixel unit is a minimum element in the search step size set.

Optionally, elements in the search step size set include y1 and y2, where y1<y2; elements in the threshold set include m1 and m2, where m1<m2; and the searching, from the target integer pixel, for a match block according to the motion vector precision includes:

obtaining a current start point according to the target integer pixel;

obtaining all y2 pixels adjacent to the current start point; and when all the y2 pixels are located outside the search region corresponding to m2, determining a position of the current start point as a position of the match block; or when at least a part of all the y2 pixels are located in the search region corresponding to m2, performing the following steps:

obtaining a target y2 pixel from the y2 pixels located in the search region corresponding to m2;

obtaining all y1 pixels adjacent to the target y2 pixel; and when all the y1 pixels are located outside the search region corresponding to m1, determining a position of the target y2 pixel as a position of the match block; or when at least a part of all the y1 pixels are located in the search region corresponding to m1, obtaining a target y1 pixel from the y1 pixels located in the search region corresponding to m1, and determining a position of the target y1 pixel as a position of the match block.

Optionally, the search step size set is $\{\frac{1}{4}, \frac{1}{8}\}$, or is $\{\frac{1}{2}, \frac{1}{4}, \frac{1}{8}\}$, or is $\{\frac{1}{4}, \frac{1}{8}, \frac{1}{16}\}$, or is $\{\frac{1}{2}, \frac{1}{4}, \frac{1}{8}, \frac{1}{16}\}$.

Optionally, the obtaining motion vector precision of the current picture according to the current picture includes:

obtaining a quantization parameter of the current picture and a coded picture set, where the coded picture set includes at least one coded picture;

obtaining coding information of each coded picture in the coded picture set, where the coding information includes a motion vector difference of each coding block in the coded picture and a quantity of pixels included in each coding block in the coded picture, and the motion vector difference of the coding block is used to indicate the motion vector information when the coding block is the current block;

computing motion intensity of each coded picture in the coded picture set, where the motion intensity of the coding picture is an average value of first values of all coding blocks in the coding picture, and a first value of each coding block is a product of a sum of an absolute value of a horizontal component of the motion vector difference of the coding block and an absolute value of a vertical component of the motion vector difference of the coding block and the quantity of pixels included in the coding block;

using a weighted average value of motion intensity of all coding pictures in the coded picture set as motion intensity of the coded picture set; and determining the motion vector precision of the current picture according to the motion intensity of the coded picture set and the quantization parameter of the current picture and according to a preset policy.

Optionally, the obtaining motion vector precision of the current picture according to the current picture further includes:

obtaining a reference parameter, where the reference parameter includes one of texture complexity of the current picture, texture complexity of the coded picture set, or inter-picture noise of the coded picture set, or includes inter-picture noise of the coded picture set and one of texture complexity of the current picture or texture complexity of the coded picture set;

where when the reference parameter includes the texture complexity of the current picture, the obtaining a reference parameter includes:

obtaining a pixel value of each pixel in the current picture; and computing an average value of quadratic sums of differences between pixel values of pixels and pixel values of adjacent pixels thereof in the current picture, and using the average value as the texture complexity of the current picture; or when the reference parameter includes the texture complexity of the coded picture set, the obtaining a reference parameter includes:

obtaining a pixel value of each pixel in each coded picture in the coded picture set;

computing an average value of quadratic sums of differences between pixel values of pixels and pixel values of adjacent pixels thereof in the coded picture, and using the average value as texture complexity of the coded picture; and using a weighted average value of texture complexity of all coding pictures in the coded picture set as the texture complexity of the coded picture set; or when the reference parameter includes the inter-picture noise of the coded picture set, the obtaining a reference parameter includes:

obtaining a prediction error of each pixel in each coded picture in the coded picture set;

computing a second average value of each coding picture, where the second average value is an average value of absolute values of prediction residual of all pixels in the coding picture; and using a weighted average value of second average values of all coded pictures in the coded picture set as the inter-picture noise of the coded picture set; and the determining the motion vector precision of the current picture according to the motion intensity of the coded picture set and the quantization parameter of the current picture and according to a preset policy specifically includes:

determining the motion vector precision of the current picture according to the motion intensity of the coded picture set, the quantization parameter of the current picture, and the reference parameter, and according to the preset policy.

Optionally, the obtaining motion vector precision of the current picture according to the current picture includes:

obtaining a quantization parameter of the current picture;

obtaining a width value in a resolution of the current picture; and determining the motion vector precision of the current picture according to the width value and the quantization parameter of the current picture and according to a preset policy.

Figure 10:
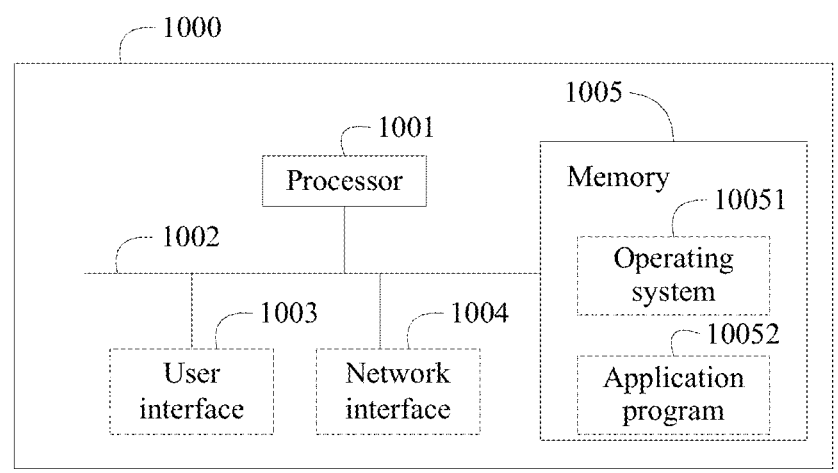
FIG. 10 is a schematic structural diagram of another video decoding apparatus according to an embodiment of the present disclosure.

Referring to FIG. 10, FIG. 10 is a structural block diagram of a video decoding apparatus 1000 according to another embodiment of the present disclosure. For a video decoding apparatus 1000, refer to FIG. 10. FIG. 10 is a structural block diagram of a video decoding apparatus 1000 according to another embodiment of the present disclosure. The video decoding apparatus 1000 may include at least one processor 1001, a memory 1005, and at least one communications bus 1002. Optionally, the video decoding apparatus 1000 may further include at least one network interface 1004 and/or a user interface 1003. The user interface 1003, for example, includes a display (for example, a touchscreen, an LCD, a holographic, a CRT, or a projector), a pointing device (for example, a mouse, a trackball, a touchpad, or a touchscreen), a camera, and/or a pickup apparatus, or the like.

The memory 1005 may include a read-only memory and a random access memory, and provide an instruction and data to the processor 1001. A part of the memory 1005 may further include a non-volatile random access memory.

In some implementations, the memory 1005 stores the following elements:

executable modules or data structures, or a subset thereof, or an extended set thereof:

an operating system 10051, including various system programs, configured to implement various basic services and process hardware-based tasks; and an application program module 10052, including various application programs, configured to implement various application services.

In this embodiment of the present disclosure, by invoking the program or instruction stored in the memory 1005, the processor 1001 may include at least one processor 1001, a memory 1005, and at least one communications bus 1002. Optionally, the video decoding apparatus 1000 may further include at least one network interface 1004 and/or a user interface 1003. The user interface 1003, for example, includes a display (for example, a touchscreen, an LCD, a holographic, a CRT, or a projector), a pointing device (for example, a mouse, a trackball, a touchpad, or a touchscreen), a camera, and/or a pickup apparatus, or the like.

The memory 1005 may include a read-only memory and a random access memory, and provide an instruction and data to the processor 1001. A part of the memory 1005 may further include a non-volatile random access memory.

In some implementations, the memory 1005 stores the following elements: executable modules or data structures, or a subset thereof, or an extended set thereof:

an operating system 10051, including various system programs, configured to implement various basic services and process hardware-based tasks; and an application program module 10052, including various application programs, configured to implement various application services.

In this embodiment of the present disclosure, by invoking the program or instruction stored in the memory 1005, the processor 1001 is configured to: obtain a current picture and motion vector precision of the current picture, where the motion vector precision includes a search step size set, and each search step size in the search step size set is less than a pixel unit; obtain motion vector information of a current block, a prediction residual signal, a reference picture of the current block, and a search start point in the reference picture, where the current block is a current to-be-decoded picture block in the current picture, the motion vector information includes a quantity of search steps for a match block of the current block, relative to the search start point, and a search direction in the reference picture, and the prediction residual signal is used to indicate a residual between the current block and the match block; search for the match block of the current block according to the reference picture, the search start point, the motion vector information, and the motion vector precision of the current picture; and obtain a reconstructed pixel value of the current block according to the match block and the prediction residual signal.

Optionally, the search step size set is $\{\frac{1}{2}^x\}$, where x is a positive integer.

Optionally, the search step size set is $\{y|y=½^x,$ where $x \in N+\}$;

optionally, the motion vector precision further includes a threshold set, and the threshold set includes at least one threshold; and the processor is further configured to determine, according to each threshold in the threshold set and the search start point, a search region corresponding to the threshold, where the search start point is located in the search region, and search step sizes in search regions corresponding to different thresholds are different elements in the search step size set; where elements in the threshold set correspond to different elements in the search step size set; and with respect to adjacent y1 and y2 sorted in the search step size set, y1<y2, and a search region corresponding to a threshold corresponding to y2 surrounds a search region corresponding to a threshold corresponding to y1 and is connected to the search region corresponding to the threshold corresponding to y1.

Optionally, the threshold set includes m1 and m2, where m1 is a positive integer multiple of 2 or is 0, m2 is a positive integer multiple of 4, and m1<m2; and the determining, according to each threshold in the threshold set and the search start point, a search region corresponding to the threshold includes:

when the search start point is located on an integer pixel or a ½ pixel, performing the following steps:

using a region in a first square as a search region corresponding to m1, where the first square is a square that uses the search start point as a center and uses 2m1*minimum pixel unit as a side length; and using a region between the first square and a second square as a search region corresponding to m2, where the second square is a square that uses the search start point as a center and uses 2m2*minimum pixel unit as a side length; or when the search start point is neither located on an integer pixel nor located on a ½ pixel, performing the following steps:

using a region in a third square as a search region corresponding to m1, where the third square is a square that uses a y2 pixel closest to the search start point as a center and uses 2m1*minimum pixel unit as a side length; and using a region between the third square and a fourth square as a search region corresponding to m2, where the fourth square is a square that uses a y3 pixel closest to the search start point as a center and uses 2m2*minimum pixel unit as a side length, and when a maximum element in the search step size set is $½^i$, $y3=½^{i-1}$; where the minimum pixel unit is a minimum element in the search step size set.

Optionally, the elements in the search step size set include y1 and y2, where y1<y2; the elements in the threshold set include m1 and m2; and the searching for the match block according to the reference picture, the search start point, the motion vector information, and the motion vector precision of the current picture includes:

determining a reference search region, where a center Ce of the reference search region is located between a center Ce1 of the search region corresponding to m1 and a center Ce2 of the search region corresponding to m2, $Ce=f_1(Ce1, Ce2)$, a side length L of the reference search region is greater than a side length L1 of the search region corresponding to m1 and less than a side length L2 of the search region corresponding to m2, $L=f_2(L1,L2)$, and $f_1(x1,x2)=f_2(x1,x2)$;

determining a temporary point, where a motion vector of the temporary point relative to the search start point is the quantity of search steps and the search direction in the motion vector information, and a search step size is the minimum element in the search step size set; and when the temporary point is located outside the reference search region, determining a first quantity of steps, a second quantity of steps, and a third quantity of steps, where the quantity of search steps is a sum of the first quantity of steps, the second quantity of steps, and the third quantity of steps, a search step size actually corresponding to the first quantity of steps is y1, a search step size actually corresponding to the second quantity of steps is y2, a search step size actually corresponding to the third quantity of steps is y3, and when the maximum element in the search step size set is $½^i$, $y3=½^{i-1}$; or when the temporary point is located in the reference search region, performing the following step:

when the temporary point is located outside the search region corresponding to m1, determining a third quantity of steps and a fourth quantity of steps, where the quantity of search steps is a sum of the third quantity of steps and the fourth quantity of steps, a search step size actually corresponding to the third quantity of steps is y1, and a search step size actually corresponding to the fourth quantity of steps is y2; or when the temporary point is located in the search region corresponding to m1, determining that a search step size actually corresponding to the quantity of search steps is y1.

Optionally, the search step size set is $\{¼, ⅛\}$, or is $\{½, ¼, ⅛\}$, or is $\{¼, ⅛, 1/16\}$, or is $\{½, ¼, ⅛, 1/16\}$.

Optionally, the obtaining a current picture and motion vector precision of the current picture includes:

receiving a bitstream of a video; and reading the current picture and the motion vector precision of the current picture from the bitstream of the video.

Optionally, the obtaining a current picture and motion vector precision of the current picture includes:

receiving a bitstream of a compressed video; reading the current picture from the bitstream of the compressed video;

obtaining a quantization parameter of the current picture; determining a decoded picture set, where the decoded picture set includes at least one current decoded picture;

obtaining decoding information of each decoded picture in the decoded picture set, where the decoding information includes a motion vector difference of each decoding block in the decoded picture and a quantity of pixels included in each decoding block in the decoded picture, and the motion vector difference of the decoding block is used to indicate the motion vector information when the decoding block is the current block;

computing motion intensity of each decoding picture in the decoded picture set, where the motion intensity of the decoding picture is an average value of first values of all decoding blocks in the decoding picture, and the first value of the decoding block is a product of a sum of an absolute value of a horizontal component of the motion vector difference of the decoding block and an absolute value of a vertical component of the motion vector difference of the decoding block and the quantity of pixels included in the decoding block;

using a weighted average value of motion intensity of all decoding pictures in the decoded picture set as motion intensity of the decoded picture set; and obtaining the motion vector precision of the current picture according to the motion intensity of the decoded picture set and the quantization parameter of the current picture and according to a preset policy.

Optionally, the obtaining a current picture and motion vector precision of the current picture further includes:

obtaining pixel values of all pixels in each decoded picture in the decoded picture set;

computing an average value of quadratic sums of differences between pixel values of pixels and pixel values of adjacent pixels thereof in the decoded picture, and using the average value as texture complexity of the decoded picture; and using a weighted average value of texture complexity of all decoded pictures in the decoded picture set as texture complexity of the decoded picture set; and the obtaining the motion vector precision of the current picture according to the motion intensity of the decoded picture set and the quantization parameter of the current picture and according to a preset policy specifically includes:

determining the motion vector precision of the current picture according to the motion intensity of the decoded picture set, the quantization parameter of the current picture, and the texture complexity of the decoded picture set, and according to the preset policy.

Optionally, the obtaining motion vector precision of the current picture includes:

obtaining a quantization parameter of the current picture;

obtaining a width value in a resolution of the current picture; and determining the motion vector precision of the current picture according to the width value and the quantization parameter of the current picture and according to a preset policy.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the related art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A video coding method, comprising:

obtaining a current picture, and obtaining motion vector precision of the current picture according to the current picture, wherein the motion vector precision comprises a search step size set, and each search step size in the search step size set is less than a pixel unit;

obtaining a current block and a reference picture of the current block, wherein the current block is a current to-be-coded picture block in the current picture;

determining a search start point in the reference picture, and searching, from the search start point, for a target integer pixel by using a pixel unit as a search step size;

searching, from the target integer pixel, for a match block of the current block according to the motion vector precision;

obtaining motion vector information and a prediction residual signal, wherein the motion vector information comprises a quantity of search steps for the match block relative to the search start point, and a search direction, and the prediction residual signal is used to indicate a residual between the current block and the match block; and writing information about the reference picture, the motion vector information, and the prediction residual signal into a bitstream, wherein the information about the reference picture is used to indicate the reference picture.

2. The video coding method according to claim 1, further comprising:

writing information about the motion vector precision and/or information about the search start point into the bitstream, wherein the information about the motion vector precision is used to indicate the motion vector precision, and the information about the search start point is used to indicate the search start point.

3. The video coding method according to claim 1, wherein the search step size set is $\{1/2^x\}$, wherein x is a positive integer.

4. The video coding method according to claim 3, wherein searching, from the target integer pixel, for a match block according to the motion vector precision comprises:
   using the target integer pixel as a start point;
   setting an initial value of j to 1, and performing a preset step;
   obtaining a target $½^j$ pixel from all $½^j$ pixels that are adjacent to the start point;
   determining whether j is equal to x;
   when j is equal to x, determining a position of the target $½^j$ pixel as a position of the match block; and
   when j is not equal to x, using the target $½^j$ pixel as a start point, and after adding 1 to the value of j, repeating the preset step.

5. The video coding method according to claim 1, wherein:
   the search step size set is $\{y|y=½^x$, wherein x is a positive integer$\}$;
   the motion vector precision further comprises a threshold set, and the threshold set comprises at least one threshold; and
   the method further comprises:
      determining, according to each threshold in the threshold set and the search start point, a search region corresponding to the threshold, wherein the search start point is located in the search region, and a search step size in the search region corresponding to each threshold corresponds to each element in the search step size set on a one-to-one basis, wherein with respect to adjacent step sizes y1 and y2 sorted in the search step size set, y1<y2, and a search region corresponding to a threshold corresponding to y2 surrounds a search region corresponding to a threshold corresponding to y1 and is connected to the search region corresponding to the threshold corresponding to y1.

6. The video coding method according to claim 5, wherein:
   the threshold set comprises m1 and m2, wherein m1 is a positive integer multiple of 2 or is 0, m2 is a positive integer multiple of 4, and m1<m2;
   determining, according to each threshold in the threshold set and the search start point, a search region corresponding to the threshold comprises:
      when the search start point is located on an integer pixel or a ½ pixel, performing the following steps:
         using a region in a first square as a search region corresponding to m1, wherein the first square is a square that uses the search start point as a center and uses 2m1*minimum pixel unit as a side length; and
         using a region between the first square and a second square as a search region corresponding to m2, wherein the second square is a square that uses the search start point as a center and uses 2m2*minimum pixel unit as a side length, or
      when the search start point is neither located on an integer pixel nor located on a ½ pixel, performing the following steps:
         using a region in a third square as a search region corresponding to m1, wherein the third square is a square that uses a y2 pixel closest to the search start point as a center and uses 2m1*minimum pixel unit as a side length; and
         using a region between the third square and a fourth square as a search region corresponding to m2, wherein the fourth square is a square that uses a y3 pixel closest to the search start point as a center and uses 2m2*minimum pixel unit as a side length, and when a maximum element in the search step size set is $½^i$, $y3=½^{i-1}$; and
   wherein the minimum pixel unit is a minimum element in the search step size set.

7. The video coding method according to claim 5, wherein:
   elements in the search step size set comprise y1 and y2, wherein y1<y2; elements in the threshold set comprise m1 and m2, wherein m1<m2; and
   searching, from the target integer pixel, for a match block according to the motion vector precision comprises:
      obtaining a current start point according to the target integer pixel,
      obtaining all y2 pixels adjacent to the current start point, and
      when all the y2 pixels are located outside the search region corresponding to m2, determining a position of the current start point as a position of the match block, or
      when at least a part of all the y2 pixels are located in the search region corresponding to m2, performing the following steps:
         obtaining a target y2 pixel from the y2 pixels located in the search region corresponding to m2,
         obtaining all y1 pixels adjacent to the target y2 pixel, and
         when all the y1 pixels are located outside the search region corresponding to m1, determining a position of the target y2 pixel as a position of the match block; or
      when at least a part of all the y1 pixels are located in the search region corresponding to m1, obtaining a target y1 pixel from the y1 pixels located in the search region corresponding to m1, and determining a position of the target y1 pixel as a position of the match block.

8. The video coding method according to claim 5, wherein the search step size set is $\{¼, ⅛\}$, or $\{½, ¼, ⅛\}$, or $\{¼, ⅛\}$, $\{ 1/16 \}$, or $\{½, ¼, ⅛, 1/16\}$.

9. The video coding method according to claim 1, wherein obtaining motion vector precision of the current picture according to the current picture comprises:
   obtaining a quantization parameter of the current picture and a coded picture set, wherein the coded picture set comprises at least one coded picture;
   obtaining coding information of each coded picture in the coded picture set, wherein the coding information comprises a motion vector difference of each coding block in the coded picture and a quantity of pixels comprised in each coding block in the coded picture, and the motion vector difference of the coding block is used to indicate the motion vector information when the coding block is the current block;
   computing motion intensity of each coded picture in the coded picture set, wherein the motion intensity of the coding picture is an average value of first values of all coding blocks in the coding picture, and a first value of each coding block is a product of a sum of an absolute value of a horizontal component of the motion vector difference of the coding block and an absolute value of a vertical component of the motion vector difference of the coding block and the quantity of pixels comprised in the coding block;
   using a weighted average value of motion intensity of all coding pictures in the coded picture set as motion intensity of the coded picture set; and determining the motion vector precision of the current picture according to the motion intensity of the coded picture set and the quantization parameter of the current picture and according to a preset policy.

10. The video coding method according to claim 9, wherein obtaining motion vector precision of the current picture according to the current picture further comprises:
obtaining a reference parameter, wherein the reference parameter comprises one of texture complexity of the current picture, texture complexity of the coded picture set, or inter-picture noise of the coded picture set, or comprises inter-picture noise of the coded picture set and one of texture complexity of the current picture or texture complexity of the coded picture set;
when the reference parameter comprises the texture complexity of the current picture, the obtaining a reference parameter comprises:
obtaining a pixel value of each pixel in the current picture, and
computing an average value of quadratic sums of differences between pixel values of pixels and pixel values of adjacent pixels thereof in the current picture, and using the average value as the texture complexity of the current picture; or
when the reference parameter comprises the texture complexity of the coded picture set, obtaining a reference parameter comprises:
obtaining a pixel value of each pixel in each coded picture in the coded picture set,
computing an average value of quadratic sums of differences between pixel values of pixels and pixel values of adjacent pixels thereof in the coded picture, and using the average value as texture complexity of the coded picture, and
using a weighted average value of texture complexity of all coding pictures in the coded picture set as the texture complexity of the coded picture set; or
when the reference parameter comprises the inter-picture noise of the coded picture set, obtaining a reference parameter comprises:
obtaining a prediction error of each pixel in each coded picture in the coded picture set,
computing a second average value of each coding picture, wherein the second average value is an average value of absolute values of prediction residual of all pixels in the coding picture, and
using a weighted average value of second average values of all coded pictures in the coded picture set as the inter-picture noise of the coded picture set; and
determining the motion vector precision of the current picture according to the motion intensity of the coded picture set and the quantization parameter of the current picture and according to a preset policy comprises:
determining the motion vector precision of the current picture according to the motion intensity of the coded picture set, the quantization parameter of the current picture, and the reference parameter, and according to the preset policy.

11. The video coding method according to claim 1, wherein obtaining motion vector precision of the current picture according to the current picture comprises:
obtaining a quantization parameter of the current picture;
obtaining a width value in a resolution of the current picture; and
determining the motion vector precision of the current picture according to the width value and the quantization parameter of the current picture and according to a preset policy.

12. A video decoding method, comprising:
obtaining a current picture and motion vector precision of the current picture, wherein the motion vector precision comprises a search step size set, and each search step size in the search step size set is less than a pixel unit;
obtaining motion vector information of a current block, a prediction residual signal, a reference picture of the current block, and a search start point in the reference picture, wherein the current block is a current to-be-decoded picture block in the current picture, the motion vector information comprises a quantity of search steps for a match block of the current block, relative to the search start point, and a search direction in the reference picture, and the prediction residual signal is used to indicate a residual between the current block and the match block;
searching for the match block of the current block according to the reference picture, the search start point, the motion vector information, and the motion vector precision of the current picture; and
obtaining a reconstructed pixel value of the current block according to the match block and the prediction residual signal.

13. The video decoding method according to claim 12, wherein the search step size set is $\{½^x\}$, wherein x is a positive integer.

14. The video decoding method according to claim 12, wherein:
the search step size set is $\{y|y=½^x, \text{wherein } x \in N+\}$;
the motion vector precision further comprises a threshold set, and the threshold set comprises at least one threshold; and
the method further comprises:
determining, according to each threshold in the threshold set and the search start point, a search region corresponding to the threshold, wherein the search start point is located in the search region, and search step sizes in search regions corresponding to different thresholds are different elements in the search step size set, and wherein elements in the threshold set correspond to different elements in the search step size set; and with respect to adjacent y1 and y2 sorted in the search step size set, y1<y2, and a search region corresponding to a threshold corresponding to y2 surrounds a search region corresponding to a threshold corresponding to y1 and is connected to the search region corresponding to the threshold corresponding to y1.

15. The video decoding method according to claim 14, wherein:
the threshold set comprises m1 and m2, wherein m1 is a positive integer multiple of 2 or is 0, m2 is a positive integer multiple of 4, and m1<m2; and
determining, according to each threshold in the threshold set and the search start point, a search region corresponding to the threshold comprises:
when the search start point is located on an integer pixel or a ½ pixel, performing the following steps:
using a region in a first square as a search region corresponding to m1, wherein the first square is a square that uses the search start point as a center and uses 2m1*minimum pixel unit as a side length, and using a region between the first square and a second square as a search region corresponding to m2, wherein the second square is a square that uses the search start point as a center and uses 2m2*minimum pixel unit as a side length; or when the search start point is neither located on an integer pixel nor located on a ½ pixel, performing the following steps:
  using a region in a third square as a search region corresponding to m1, wherein the third square is a square that uses a y2 pixel closest to the search start point as a center and uses 2m1*minimum pixel unit as a side length, and
  using a region between the third square and a fourth square as a search region corresponding to m2, wherein the fourth square is a square that uses a y3 pixel closest to the search start point as a center and uses 2m2*minimum pixel unit as a side length, and when a maximum element in the search step size set is $½^i$, $y3=½^{i-1}$; and wherein the minimum pixel unit is a minimum element in the search step size set.

16. The video decoding method according to claim 15, wherein:
  the elements in the search step size set comprise y1 and y2, wherein y1<y2; the elements in the threshold set comprise m1 and m2; and
  searching for the match block according to the reference picture, the search start point, the motion vector information, and the motion vector precision of the current picture comprises:
    determining a reference search region, wherein a center Ce of the reference search region is located between a center Ce1 of the search region corresponding to m1 and a center Ce2 of the search region corresponding to m2, $Ce=f_1(Ce1,Ce2)$, a side length L of the reference search region is greater than a side length L1 of the search region corresponding to m1 and less than a side length L2 of the search region corresponding to m2, $L=f_2(L1,L2)$, and $f_1(x1,x2)=f_2(x1,x2)$,
    determining a temporary point, wherein a motion vector of the temporary point relative to the search start point is the quantity of search steps and the search direction in the motion vector information, and a search step size is the minimum element in the search step size set, and
    when the temporary point is located outside the reference search region, determining a first quantity of steps, a second quantity of steps, and a third quantity of steps, wherein the quantity of search steps is a sum of the first quantity of steps, the second quantity of steps, and the third quantity of steps, a search step size actually corresponding to the first quantity of steps is y1, a search step size actually corresponding to the second quantity of steps is y2, a search step size actually corresponding to the third quantity of steps is y3, and when the maximum element in the search step size set is $½^i$, $y3=½^{i-1}$, or
    when the temporary point is located in the reference search region, performing the following step:
      when the temporary point is located outside the search region corresponding to m1, determining a third quantity of steps and a fourth quantity of steps, wherein the quantity of search steps is a sum of the third quantity of steps and the fourth quantity of steps, a search step size actually corresponding to the third quantity of steps is y1, and a search step size actually corresponding to the fourth quantity of steps is y2; or
      when the temporary point is located in the search region corresponding to m1, determining that a search step size actually corresponding to the quantity of search steps is y1.

17. The video decoding method according to claim 14, wherein the search step size set is {¼, ⅛}, or {½, ¼, ⅛}, or {¼, ⅛, 1/16}, or {½, ¼, ⅛, 1/16}.

18. The video decoding method according to claim 12, wherein obtaining a current picture and motion vector precision of the current picture comprises:
  receiving a bitstream of a video; and
  reading the current picture and the motion vector precision of the current picture from the bitstream of the video.

19. The video decoding method according to claim 12, wherein obtaining a current picture and motion vector precision of the current picture comprises:
  receiving a bitstream of a compressed video;
  reading the current picture from the bitstream of the compressed video;
  obtaining a quantization parameter of the current picture;
  determining a decoded picture set, wherein the decoded picture set comprises at least one current decoded picture;
  obtaining decoding information of each decoded picture in the decoded picture set, wherein the decoding information comprises a motion vector difference of each decoding block in the decoded picture and a quantity of pixels comprised in each decoding block in the decoded picture, and the motion vector difference of the decoding block is used to indicate the motion vector information when the decoding block is the current block;
  computing motion intensity of each decoding picture in the decoded picture set, wherein the motion intensity of the decoding picture is an average value of first values of all decoding blocks in the decoding picture, and the first value of the decoding block is a product of a sum of an absolute value of a horizontal component of the motion vector difference of the decoding block and an absolute value of a vertical component of the motion vector difference of the decoding block and the quantity of pixels comprised in the decoding block;
  using a weighted average value of motion intensity of all decoding pictures in the decoded picture set as motion intensity of the decoded picture set; and
  obtaining the motion vector precision of the current picture according to the motion intensity of the decoded picture set and the quantization parameter of the current picture and according to a preset policy.

20. The video decoding method according to claim 19, wherein:
  obtaining a current picture and motion vector precision of the current picture further comprises:
    obtaining pixel values of all pixels in each decoded picture in the decoded picture set,
    computing an average value of quadratic sums of differences between pixel values of pixels and pixel values of adjacent pixels thereof in the decoded picture, and using the average value as texture complexity of the decoded picture, and
    using a weighted average value of texture complexity of all decoded pictures in the decoded picture set as texture complexity of the decoded picture set; and obtaining the motion vector precision of the current picture according to the motion intensity of the decoded picture set and the quantization parameter of the current picture and according to a preset policy comprises:
    determining the motion vector precision of the current picture according to the motion intensity of the decoded picture set, the quantization parameter of the current picture, and the texture complexity of the decoded picture set, and according to the preset policy.

21. The video decoding method according to claim 12, wherein obtaining motion vector precision of the current picture comprises:
    obtaining a quantization parameter of the current picture;
    obtaining a width value in a resolution of the current picture; and
    determining the motion vector precision of the current picture according to the width value and the quantization parameter of the current picture and according to a preset policy.

* * * * *

UNITED STATES PATENT AND TRADEMARK OFFICE
CERTIFICATE OF CORRECTION

PATENT NO. : 10,523,965 B2
APPLICATION NO. : 15/860531
DATED : December 31, 2019
INVENTOR(S) : Zhao Wang et al.

It is certified that error appears in the above-identified patent and that said Letters Patent is hereby corrected as shown below:

On the Title Page

Page 2, References Cited, Foreign Patent Documents, Column 1, Line 13 "CN 140702957 A 6/2015" should read "CN 104702957 A 6/2015"

Signed and Sealed this
Eleventh Day of February, 2020

Andrei Iancu
*Director of the United States Patent and Trademark Office*